(12) United States Patent
Gisquet et al.

(10) Patent No.: US 10,009,615 B2
(45) Date of Patent: Jun. 26, 2018

(54) METHOD AND APPARATUS FOR VECTOR ENCODING IN VIDEO CODING AND DECODING

(71) Applicant: CANON KABUSHIKI KAISHA, Tokyo (JP)

(72) Inventors: Christophe Gisquet, Rennes (FR); Guillaume Laroche, Melesse (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 14/874,170

(22) Filed: Oct. 2, 2015

(65) Prior Publication Data

US 2016/0100186 A1  Apr. 7, 2016

(30) Foreign Application Priority Data

Oct. 6, 2014 (GB) .................................. 1417649.9
Jan. 29, 2015 (GB) .................................. 1501514.2

(51) Int. Cl.
*H04N 19/147* (2014.01)
*H04N 19/176* (2014.01)
(Continued)

(52) U.S. Cl.
CPC ......... *H04N 19/176* (2014.11); *H04N 19/107* (2014.11); *H04N 19/119* (2014.11);
(Continued)

(58) Field of Classification Search
CPC .. H04N 19/147; H04N 19/176; H04N 19/593; H04N 19/107; H04N 19/52;
(Continued)

(56) References Cited

U.S. PATENT DOCUMENTS

2004/0146109 A1    7/2004  Kondo et al.
2015/0063454 A1*   3/2015  Guo ..................... H04N 19/50
                                                  375/240.12

(Continued)

FOREIGN PATENT DOCUMENTS

EP    2536148 A1    12/2012
EP    2582138 A1     4/2013
GB    2282021 A      3/1995

OTHER PUBLICATIONS

Kwon, et al., "Fast Intra Block Copy (IntraBC) search for HEVC screen content coding", IEEE International Symposium on Circuits and Systems, Jun. 2014, Available at http://ieeexplore.ieee.org/xpl/articleDetails.jsp?amumber=6865052.

*Primary Examiner* — Jingge Wu
(74) *Attorney, Agent, or Firm* — Canon USA, Inc. I.P. Division

(57) ABSTRACT

The present invention concerns a method of encoding an image, the image comprising a plurality of coding elements made of blocks of pixels, each block of pixels being encoded according to a coding mode out of a plurality of coding modes, the method comprising for each block of pixel to be encoded determining the coding mode to be used for the encoding of a given block of pixels by sequentially evaluating some coding modes in the plurality of coding modes; wherein the method comprises evaluating Inter coding modes and fast IBC coding modes; and no residue-test is conducted between the evaluation of the Inter coding mode and the evaluation of the fast IBC mode. Accordingly, some good predictors may be found more rapidly and the whole encoding process is speed up.

6 Claims, 19 Drawing Sheets

(51) Int. Cl.
*H04N 19/52* (2014.01)
*H04N 19/119* (2014.01)
*H04N 19/107* (2014.01)
*H04N 19/132* (2014.01)

(52) U.S. Cl.
CPC ......... *H04N 19/132* (2014.11); *H04N 19/147* (2014.11); *H04N 19/52* (2014.11)

(58) Field of Classification Search
CPC .... H04N 19/159; H04N 19/11; H04N 19/132; H04N 19/119; H04N 19/103; H04N 19/50
See application file for complete search history.

(56) References Cited

U.S. PATENT DOCUMENTS

| | | | |
|---|---|---|---|
| 2015/0098504 A1* | 4/2015 | Pang | H04N 19/176 375/240.12 |
| 2015/0189272 A1* | 7/2015 | Peng | H04N 19/105 375/240.02 |
| 2015/0261884 A1* | 9/2015 | Pang | G06F 17/30949 707/741 |
| 2015/0264386 A1* | 9/2015 | Pang | H04N 19/513 375/240.16 |
| 2015/0271515 A1* | 9/2015 | Pang | H04N 19/70 375/240.16 |
| 2015/0271517 A1* | 9/2015 | Pang | H04N 19/105 375/240.02 |
| 2015/0373370 A1* | 12/2015 | Rapaka | H04N 19/52 375/240.02 |
| 2016/0057420 A1* | 2/2016 | Pang | H04N 19/124 375/240.16 |
| 2016/0100163 A1* | 4/2016 | Rapaka | H04N 19/117 375/240.16 |
| 2016/0105670 A1* | 4/2016 | Pang | H04N 19/105 375/240.16 |
| 2016/0219298 A1* | 7/2016 | Li | H04N 19/593 |
| 2016/0234530 A1* | 8/2016 | Xu | H04N 19/503 |
| 2016/0241858 A1* | 8/2016 | Li | H04N 19/159 |
| 2016/0255345 A1* | 9/2016 | Liu | H04N 19/70 375/240.13 |
| 2016/0277761 A1* | 9/2016 | Li | H04N 19/105 |
| 2016/0330474 A1* | 11/2016 | Liu | H04N 19/503 |

\* cited by examiner

METHOD AND APPARATUS FOR VECTOR ENCODING IN VIDEO CODING AND DECODING

This application claims the benefit under 35 U.S.C. § 119(a)-(d) of United Kingdom Patent Application No. 1417649.9, filed on Oct. 6, 2014 and entitled "METHOD AND APPARATUS FOR VECTOR ENCODING IN VIDEO CODING AND DECODING" and of United Kingdom Patent Application No. 1501514.2, filed on Jan. 29, 2015 and entitled "METHOD AND APPARATUS FOR VECTOR ENCODING IN VIDEO CODING AND DECODING". The above cited patent applications are incorporated herein by reference in their entirety.

FIELD OF THE INVENTION

The present invention concerns a method and a device for encoding or decoding vectors components in the process of encoding or decoding a video. It concerns more particularly the encoding and decoding of vector blocks in INTRA Block Copy mode and Inter mode of HEVC Screen Content extension.

It applies more particularly to a mode of coding where a block of pixel is predictively encoded based on a predictor block pertaining to the same image. This mode of encoding a block of pixel is generally referred to as INTRA Block Copy (IBC) mode. It is considered as a tool candidate for the Screen content Extension of the High Efficiency Video Coding (HEVC: ISO/IEC 23008-2 MPEG-H Part 2/ITU-T H.265) international standard and now in the Screen Content extension of the same.

BACKGROUND OF THE INVENTION

When encoding an image in a video sequence, the image is first divided into coding entities of pixels of equal size referred to as Coding Tree Block (CTB). The size of a Coding Tree Block is typically 64 by 64 pixels. Each Coding Tree Block may then be decomposed in a hierarchical tree of smaller blocks which size may vary and which are the actual blocks to encode. These smaller blocks to encode are referred to as Coding Unit (CU).

The encoding of a particular Coding Unit is typically predictive. This means that a predictor block is first determined. Next, the difference between the predictor block and the Coding Unit is calculated. This difference is called the residue. Next, this residue is compressed. The actual encoded information of the Coding Unit is made of some information to indicate the way of determining the predictor block and the compressed residue. Best predictor blocks are blocks as similar as possible to the Coding Unit in order to get a small residue that could be efficiently compressed.

Encoding may be lossy, meaning that information is lost in the encoding process. The decoded block of pixel is not exactly the same as the original Coding Unit. Typically the loss of information comes from a quantization applied to the residue before entropy coding. This quantization allows a higher compression rate at the price of the loss of accuracy. Typically, high frequencies, namely the high level of details, are removed in the block.

Encoding may be lossless, meaning that the residue is not quantized. This kind of encoding allows retrieving the exact copy of the original samples of the Coding Unit. The lossless encoding is obtained at the expense of compression rate which is much smaller compared to a lossy compression.

The coding mode is defined based on the method used to determine the predictor block for the predictive encoding method of a Coding Unit.

A first coding mode is referred to as INTRA mode. According to INTRA mode, the predictor block is built based on the value of pixels immediately surrounding the Coding Unit within the current image. It is worth noting that the predictor block is not a block of the current image but a construction. A direction is used to determine which pixels of the border are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

A second coding mode is referred to as INTER mode. According to INTER mode, the predictor block is a block of another image. The idea behind the INTER mode is that successive images in a sequence are generally very similar. The main difference comes typically from a motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residue.

We focus in this document on a third coding mode called INTRA Block Copy mode. According to the INTRA Block Copy mode, the block predictor is an actual block of the current image. A block vector (BV) is used to locate the predictor block. This block vector gives the location in the current image of the predictor block relatively to the location of the Coding Unit in the same current image. It comes that this block vector shares some similarities with the motion vector of the INTER mode. It is sometime called motion vector by analogy. As there could not be a motion within an image, strictly speaking, and for the sake of clarity, in this document motion vector always refer to the INTER mode while block vector is used for the INTRA Block Copy mode.

The causal principle is the principle that states that all information to decode a particular Coding Unit must be based on already reconstructed Coding Units. At encoding, the whole information may be considered as available. Namely, to encode a given Coding Unit it would be possible to use any information from the entire current images or from all decoded and available other images in the sequence. At decoding, things are different. The decoding of the current images is typically done by decoding sequentially all Coding Unit. The order of decoding follows typically a raster scan order, namely beginning in the upper left of the image, progressing from left to right and from top to bottom. It come that when decoding a given Coding Unit, only the part of the current image located up or left to the current Coding Unit has already been decoded. This is the only available information for the decoding of the current Coding Unit. This has to be taken into account at encoding. For example, a predictor block in INTRA Block Copy mode, should pertain to the part of the image that will be available at decoding.

INTRA block copy is very similar to the INTER, MERGE or SKIP modes in that the encoder uses block matching to find the prediction block. This is unfortunately a computationally intensive task, and it is beneficial to take into account the block properties to design efficient search algorithms.

The present invention has been devised to address one or more of the foregoing concerns.

SUMMARY OF THE INVENTION

According to a first aspect of the invention there is provided a method of encoding an image, the image comprising a plurality of coding elements made of blocks of pixels, each block of pixels being encoded according to a mode out of a plurality of modes, some of these modes comprising the encoding of the block of pixels based on a predictor block, this predictor block being designed by a block vector giving its location in the image it belongs to relatively to the current block of pixel being encoded, the method comprising: during the encoding of a first coding unit, storing in a cache memory block vectors determined as designating good predictor blocks for this first coding unit; first testing predictor blocks designed by block vectors stored in the cache memory for at least some encoding mode during the encoding of a second coding unit.

Accordingly, the encoding process may be speed up by first testing potential good candidates.

In one embodiment, the method further comprises: also first testing first predictor blocks belonging to a line of coding elements designed by block vectors stored in the cache memory for at least some encoding mode during the encoding of a second unit.

In one embodiment, one mode being called INTRA Block Copy mode in which the block is encoded based on a predictor block being an actual block of the current image, wherein: said block vectors stored in the memory cache are determined when testing INTRA Block Copy mode for said first coding unit; and first testing predictor blocks designed by block vectors stored in the cache memory for INTRA Block Copy mode during the encoding of a second coding unit.

In one embodiment, the block vectors from the cache memory tested first during the encoding of the second unit have been determined as designating good predictor blocks for coding unit in the neighbourhood of said second unit.

In one embodiment, the method comprises for a given coding unit: testing a given number of INTER prediction modes; testing a given number of INTRA prediction modes; and wherein: testing a given number of block vectors from the cache memory according to INTRA Block Copy mode is carried on after the testing of INTER prediction modes and before the testing of INTRA prediction modes.

In one embodiment, if testing some block vectors from the cache memory according to INTRA Block Copy mode satisfies a predetermined criterion, the method comprises skipping the step of testing INTRA prediction modes.

In one embodiment, the method comprises for testing INTRA prediction modes: testing a first group of INTRA prediction modes; testing INTRA Block Copy mode according to a first coding unit partitioning; evaluating coding cost of the different tests; if the current best INTRA coding mode cost satisfies a predetermined criterion testing other coding unit partitions for INTRA Block Copy mode; and wherein: if the current best intra coding mode cost does not satisfy said predetermined criterion, further performing a test of the predictor blocks for the coding unit according to a N×N partitioning, said predictor blocks being designed by block vectors stored in cache memory. Typically, N is defined by the size of the initial partitioning being 2N×2N.

In one embodiment, the method comprises for testing at least some INTRA Block Copy prediction modes: testing only predictor blocks designed by block vectors stored in the cache memory.

In one embodiment, each block vector stored in the cache memory is only stored once.

In one embodiment, one mode being called INTER mode in which the block is encoded based on a predictor block being an actual block of another image; said block vectors stored in the memory cache are determined when testing INTER mode for said first coding unit; and first testing predictor blocks designed by the block vectors stored in the cache memory for INTER mode during the encoding of a second coding unit.

In one embodiment, one mode being called INTER mode in which the block is encoded based on a predictor block being an actual block of another image, one mode being called INTRA Block Copy mode in which the block is encoded based on a predictor block being an actual block of the same image; said block vectors stored in the memory cache are determined when testing INTER mode and INTRA Block Copy mode for said first coding unit; and first testing predictor blocks designed by the block vectors stored in the cache memory for INTER mode or INTRA Block Copy mode during the encoding of a second coding unit.

According to another aspect of the invention there is provided a device for encoding an image, the image comprising a plurality of coding elements made of blocks of pixels, each block of pixels being encoded according to a mode out of a plurality of modes, some of these modes comprising the encoding of the block of pixels based on a predictor block, this predictor block being designed by a block vector giving its location in the image it belongs to relatively to the current block of pixel being encoded, the device comprising: a cache memory for storing block vectors determined as designating good predictor blocks for this first coding unit during the encoding of a first coding unit; and a testing module for first testing predictor blocks designed by block vectors stored in the cache memory for at least some encoding mode during the encoding of a second coding unit.

According to another aspect of the invention there is provided a method of encoding an image, the image comprising a plurality of coding elements made of blocks of pixels, each block of pixels being encoded according to a coding mode out of a plurality of coding modes, the method comprising for each block of pixel to be encoded:
determining the coding mode to be used for the encoding of a given block of pixels by sequentially evaluating some coding modes in the plurality of coding modes;
wherein the method comprises:
evaluating Inter coding modes and fast IBC coding modes; and
no residue-test is conducted between the evaluation of the Inter coding mode and the evaluation of the fast IBC mode.

In one embodiment, Inter coding modes and fast IBC coding modes are evaluated in sequence.

In one embodiment, the method further comprises: evaluating Intra coding modes and classical IBC coding modes in sequence after the evaluation of Inter coding modes and fast IBC coding modes.

In one embodiment, the method further comprises: conducting a residue-test after evaluation of fast IBC coding modes to early terminate coding mode evaluation in case a coding mode leading to no residue has been found.

In one embodiment, no residue-test is conducted between the evaluation of the Intra coding mode and the evaluation of the classical IBC mode.

In one embodiment, said method further comprises evaluating first the Skip coding mode; and further evaluation steps are only conducted if the Skip coding mode has not been selected.

In one embodiment, fast IBC coding modes and Inter coding modes are evaluated in sequence.

In one embodiment, the method further comprises next evaluating Intra coding mode and classical IBC mode.

According to another aspect of the invention there is provided a method of encoding an image, the image comprising a plurality of coding elements made of blocks of pixels, each block of pixels being encoded according to a coding mode out of a plurality of coding modes, the method comprising for each block of pixel to be encoded:
determining the coding mode to be used for the encoding of a given block of pixels by sequentially evaluating some coding modes in the plurality of coding modes;
wherein the method comprises:
evaluating first the Skip coding mode; and
evaluating next the fast IBC coding modes if the Skip coding mode has not been selected.

In one embodiment, the method comprises next:
evaluating the Inter coding mode, the Intra coding mode and the classical IBC mode; and
conducting a residue-test after evaluation of fast IBC coding modes to early terminate coding mode evaluation of coding modes in case a coding mode leading to no residue has been found.

According to another aspect of the invention there is provided a method of encoding an image, the image comprising a plurality of coding elements made of blocks of pixels, each block of pixels being encoded according to a coding mode out of a plurality of coding modes, the method comprising for each block of pixel to be encoded:
determining the coding mode to be used for the encoding of a given block of pixels by sequentially evaluating some coding modes in the plurality of coding modes;
wherein the method comprises:
evaluating first Inter hash based coding mode; and
evaluating next the Skip coding mode; and
evaluating next the fast IBC coding modes if the Skip coding mode has not been selected.

In one embodiment, the method further comprises:
evaluating next the Intra coding mode and the classical IBC mode; and
conducting a residue-test after the evaluation of fast IBC coding modes to early terminate coding mode evaluation of coding modes in case a coding mode leading to no residue has been found.

According to another aspect of the invention there is provided a method of encoding an image, the image comprising a plurality of coding elements made of blocks of pixels, each block of pixels being encoded according to a coding mode out of a plurality of coding modes, the method comprising for each block of pixel to be encoded:
determining the coding mode to be used for the encoding of a given block of pixels by sequentially evaluating some coding modes in the plurality of coding modes;
wherein the method comprises:
evaluating the fast IBC coding mode.

In one embodiment, the fast IBC coding mode is evaluated first.

In one embodiment, the method further comprises: evaluating next the Inter hash based coding mode.

In one embodiment, the method further comprises:
evaluating next the Intra coding mode and the classical IBC mode; and
conducting a residue-test after the evaluation of fast IBC coding modes to early terminate coding mode evaluation of coding modes in case a coding mode leading to no residue has been found, a residue-test being a test to determine if so far a predictor block of pixels has been found during the evaluation leading to an encoding of the current block of pixels without residue.

In one embodiment, the method comprises:
conducting a residue-test after evaluation of the fast IBC coding modes to early terminate coding mode evaluation of coding modes in case a coding mode leading to no residue has been found.

According to another aspect of the invention there is provided a method of encoding an image, the image comprising a plurality of coding elements made of blocks of pixels, each block of pixels being encoded according to a coding mode out of a plurality of coding modes, the method comprising for each block of pixel to be encoded:
determining the coding mode to be used for the encoding of a given block of pixels by sequentially evaluating some coding modes in the plurality of coding modes;
wherein the method comprises:
evaluating first Inter hash based coding mode; and
evaluating next the fast IBC coding mode if the Inter has coding mode evaluation has not been selected.

In one embodiment, the fast IBC evaluation contains a larger evaluation including sub-partitioning and CU size evaluation.

In one embodiment, said method is only applied for some given size of block of pixels.

In one embodiment, early termination of coding mode evaluation ends the evaluation process for the current block of pixel.

In one embodiment, early termination of coding mode evaluation leads to a step to determine if sub-block of pixels analysis must be performed.

According to another aspect of the invention there is provided a device for encoding an image configured to implement any method according to the invention.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

Figure 1:
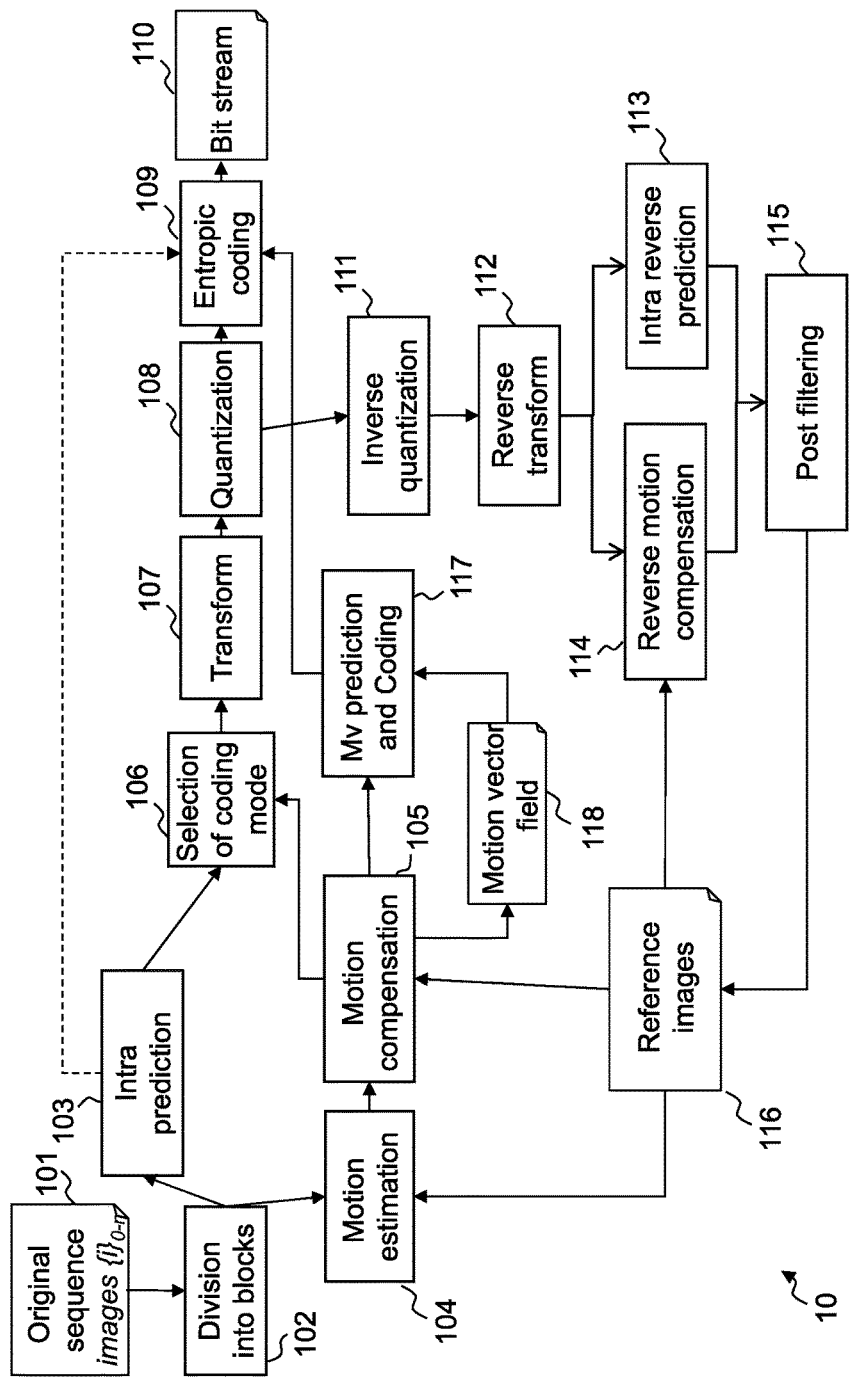
FIG. 1 illustrates the HEVC encoder architecture.

FIG. 1 illustrates the HEVC encoder architecture. In the video encoder, an original sequence 101 is divided into blocks of pixels 102. A coding mode is then affected to each block. There are two families of coding modes typically used in HEVC: the modes based on spatial prediction or INTRA modes 103 and the modes based on temporal prediction or INTER modes based on motion estimation 104 and motion compensation 105. An INTRA Coding Unit is generally predicted from the encoded pixels at its causal boundary by a process called INTRA prediction.

Temporal prediction first consists in finding in a previous or future frame called the reference frame 116 the reference area which is the closest to the Coding Unit in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighbouring motion vectors, used for the prediction, are extracted from the motion vector field 118.

Then, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113. Then, this first reconstruction is filtered in module 115 by one or several kinds of post filtering. These post filters are integrated in the encoded and decoded loop. It means that they need to be applied on the reconstructed frame at encoder and decoder side in order to use the same reference frame at encoder and decoder side. The aim of this post filtering is to remove compression artefacts.

Figure 2:
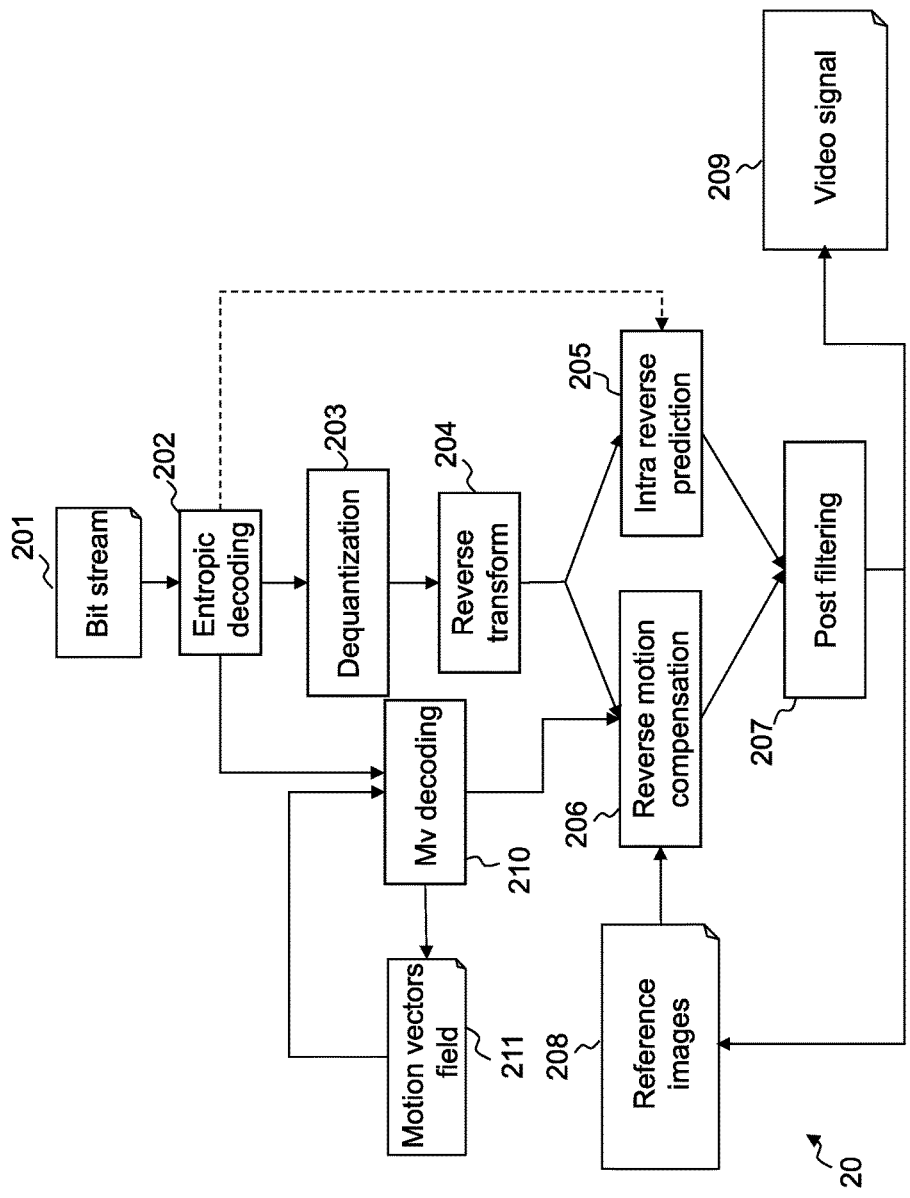
FIG. 2 illustrates the HEVC decoder architecture.

In FIG. 2, have been represented the principle of a decoder. The video stream 201 is first entropy decoded in a module 202. The residual data are then inverse quantized in a module 203 and inverse transformed in a module 204 to obtain pixel values. The mode data are also entropy decoded in function of the mode, an INTRA type decoding or an INTER type decoding is performed. In the case of INTRA mode, an INTRA predictor is determined in function of the INTRA prediction mode specified in the bitstream 205. If the mode is INTER, the motion information is extracted from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

This INTRA Block Copy coding mode is particularly well suited for extremely repetitive patterns. In particular, it is known to help coding graphical elements such as glyphs, the graphical representation of a character, or traditional GUI elements, which are very difficult to code using traditional INTRA prediction methods.

It is worth noting that prediction is based on coherence between neighbour Coding Units. This coherence may be geographic when considered within the current frame or temporal when considered across successive frames. This kind of coherence occurs in natural images. As INTRA Block Copy encoding mode is seen as a mode dedicated to text or symbolic images, predication is thought as useless for this kind of image. For instance, there is no reason to have two successive Coding Units in an image representing a text having good predictors close to each other. The first Coding Unit may be the part of letter "A", a good predictor block would therefore come from another "A" in the text. While the next Coding Unit would be a "P" letter having a predictor block from another "P" in the text. There is no reason, a-priori, to have the two predictor blocks in the same neighbourhood. This is why prior art does not contemplate introducing prediction in INTRA Block Copy encoding mode.

The current design of HEVC uses 3 different INTER modes: the Inter mode, the Merge mode and the Merge Skip mode. The main difference between these modes is the data signalling in the bitstream. For the Motion vector coding, the current HEVC standard includes a competitive based scheme for Motion vector prediction compared to its predecessors. It means that several candidates are competing with the rate distortion criterion at encoder side in order to find the best motion vector predictor or the best motion information for respectively the Inter or the Merge mode. An index corresponding to the best predictors or the best candidate of the motion information is inserted in the bitstream. The decoder can derive the same set of predictors or candidates and uses the best one according to the decoded index.

The design of the derivation of predictors and candidate is very important to achieve the best coding efficiency without large impact on complexity. In HEVC two motion vector derivations are used: one for Inter mode (Advanced Motion Vector Prediction (AMVP)) and one for Merge modes (Merge derivation process). The following describes these processes.

Figure 3:
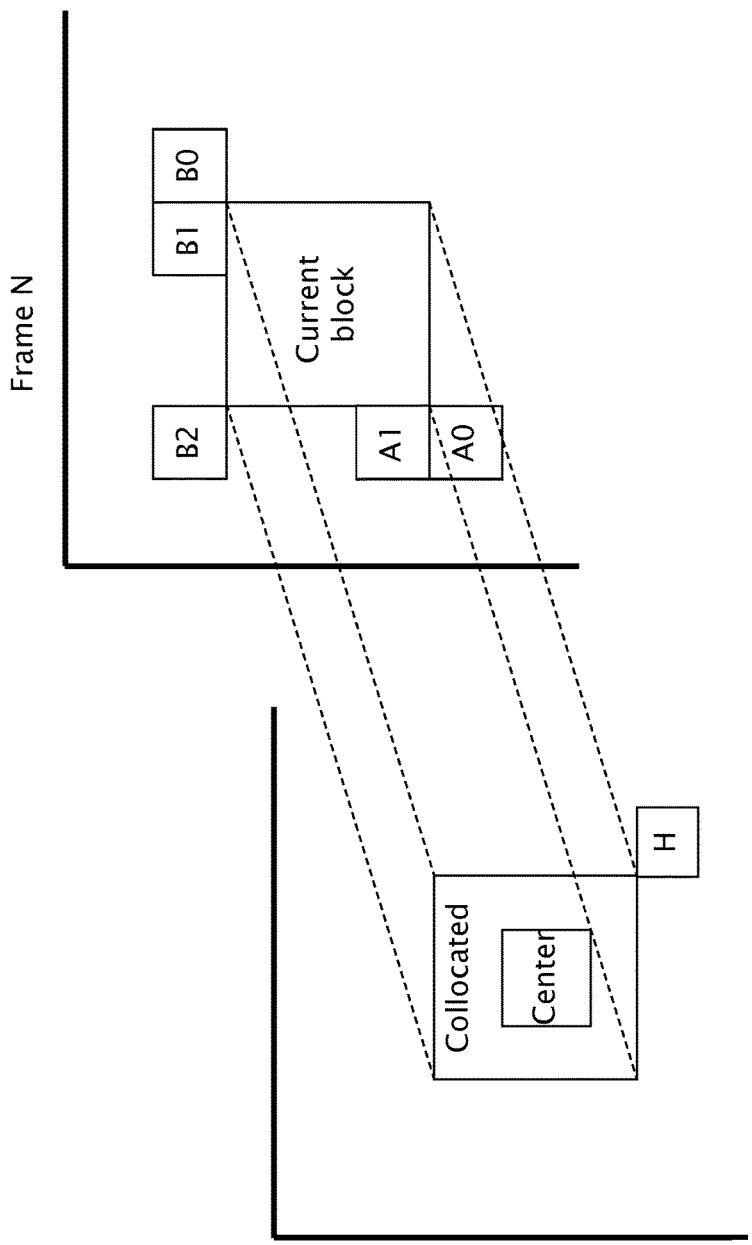
FIG. 3 illustrates the neighbouring positions blocks used to generate motion vector predictors in AMVP and Merge of HEVC.
Figure 4:
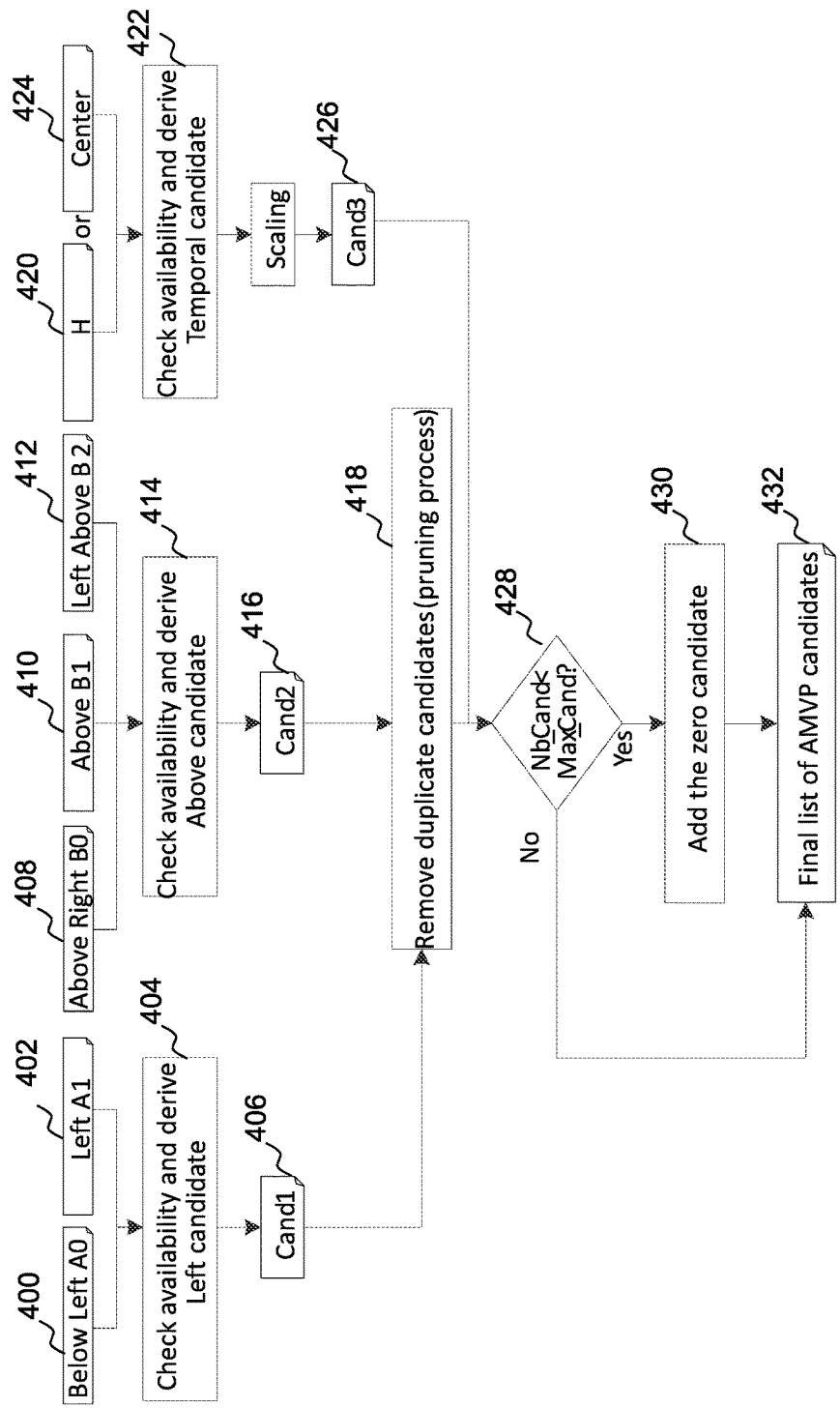
FIG. 4 illustrates the derivation process of motion vector predictors in AMVP.

FIG. 3 illustrates spatial and temporal blocks that can be used to generate motion vector predictors in Advanced Motion Vector Prediction (AMVP) and Merge modes of HEVC coding and decoding systems and FIG. 4 shows simplified steps of the process of the AMVP predictor set derivation.

Two predictors, i.e. the two spatial motion vectors of the AMVP mode, are chosen among the top blocks and the left blocks including the top corner blocks and left corner block and one predictor is chosen among the bottom right block and centre block of the collocated block as represented in FIG. 3.

FIG. 3 illustrates spatial and temporal blocks that can be used to generate motion vector predictors in Advanced Motion Vector Prediction (AMVP) and Merge modes of HEVC coding and decoding systems and FIG. 4 shows simplified steps of the process of the AMVP predictor set derivation.

Two predictors, i.e. the two spatial motion vectors of the AMVP mode, are chosen among the top blocks and the left blocks including the top corner blocks and left corner block and one predictor is chosen among the bottom right block and centre block of the collocated block as represented in FIG. 3.

Turning to FIG. 4, a first step aims at selecting a first spatial predictor (Cand 1, 406) among the bottom left blocks A0 and A1, that spatial positions are illustrated in FIG. 3. To that end, these blocks are selected (400, 402) one after another, in the given order, and, for each selected block, following conditions are evaluated (404) in the given order, the first block for which conditions are fulfilled being set as a predictor:

the motion vector from the same reference list and the same reference image;
the motion vector from the other reference list and the same reference image;
the scaled motion vector from the same reference list and a different reference image; or
the scaled motion vector from the other reference list and a different reference image.

If no value is found, the left predictor is considered as being unavailable. In this case, it indicates that the related blocks were INTRA coded or those blocks do not exist.

A following step aims at selecting a second spatial predictor (Cand 2, 416) among the above right block B0, above block B1, and left above block B2, that spatial positions are illustrated in FIG. 3. To that end, these blocks are selected (408, 410, 412) one after another, in the given order, and, for each selected block, the above mentioned conditions are evaluated (414) in the given order, the first block for which the above mentioned conditions are fulfilled being set as a predictor.

Again, if no value is found, the top predictor is considered as being unavailable. In this case, it indicates that the related blocks were INTRA coded or those blocks do not exist.

In a next step (418), the two predictors, if both are available, are compared one to the other to remove one of them if they are equal (i.e. same motion vector values, same reference list, same reference index and the same direction type). If only one spatial predictor is available, the algorithm is looking for a temporal predictor in a following step.

The temporal motion predictor (Cand 3, 426) is derived as follows: the bottom right (H, 420) position of the collocated block in a previous frame is first considered in the availability check module 422. If it does not exist or if the motion vector predictor is not available, the centre of the collocated block (Centre, 424) is selected to be checked. These temporal positions (Centre and H) are depicted in FIG. 3.

The motion predictor value is then added to the set of predictors. Next, the number of predictors (Nb_Cand) is compared (428) to the maximum number of predictors (Max_Cand). As mentioned above, the maximum number of predictors (Max_Cand) of motion vector predictors that the derivation process of AMVP needs to generate is two in the current version of HEVC standard.

If this maximum number is reached, the final list or set of AMVP predictors (432) is built. Otherwise, a zero predictor is added (430) to the list. The zero predictor is a motion vector equal to (0,0).

As illustrated in FIG. 4, the final list or set of AMVP predictors (432) is built from a subset of spatial motion predictors (400 to 412) and from a subset of temporal motion predictors (420, 424).

As mentioned above, a motion predictor candidate of Merge mode or of Merge Skip mode represents all the required motion information: direction, list, reference frame index, and motion vectors. An indexed list of several candidates is generated by a merge derivation process. In the current HEVC design the maximum number of candidates for both Merge modes is equal to five (4 spatial candidates and 1 temporal candidate).

Figure 5:
FIG. 5 illustrates the derivation process of motion candidates in Merge.

FIG. 5 is a schematic of a motion vector derivation process of the Merge modes. In a first step of the derivation process, five block positions are considered (500 to 508). These positions are the spatial positions depicted in FIG. 3 with references A1, B1, B0, A0, and B2. In a following step, the availability of the spatial motion vectors is checked and at most five motion vectors are selected (510). A predictor is considered as available if it exists and if the block is not INTRA coded. Therefore, selecting the motion vectors corresponding to the five blocks as candidates is done according to the following conditions:

- if the "left" A1 motion vector (500) is available (510), i.e. if it exists and if this block is not INTRA coded, the motion vector of the "left" block is selected and used as a first candidate in list of candidate (514);
- if the "above" B1 motion vector (502) is available (510), the candidate "above" block motion vector is compared to "left" A1 motion vector (512), if it exists. If B1 motion vector is equal to A1 motion vector, B1 is not added to the list of spatial candidates (514). On the contrary, if B1 motion vector is not equal to A1 motion vector, B1 is added to the list of spatial candidates (514);
- if the "above right" B0 motion vector (504) is available (510), the motion vector of the "above right" is compared to B1 motion vector (512). If B0 motion vector is equal to B1 motion vector, B0 motion vector is not added to the list of spatial candidates (514). On the contrary, if B0 motion vector is not equal to B1 motion vector, B0 motion vector is added to the list of spatial candidates (514);
- if the "below left" A0 motion vector (506) is available (510), the motion vector of the "below left" is compared to A1 motion vector (512). If A0 motion vector is equal to A1 motion vector, A0 motion vector is not added to the list of spatial candidates (514). On the contrary, if A0 motion vector is not equal to A1 motion vector, A0 motion vector is added to the list of spatial candidates (514); and
- if the list of spatial candidates doesn't contain four candidates, the availability of "above left" B2 motion vector (508) is checked (510). If it is available, it is compared to A1 motion vector and to B1 motion vector. If B2 motion vector is equal to A1 motion vector or to B1 motion vector, B2 motion vector is not added to the list of spatial candidates (514). On the contrary, if B2 motion vector is not equal to A1 motion vector or to B1 motion vector, B2 motion vector is added to the list of spatial candidates (514).

At the end of this stage, the list of spatial candidates comprises up to four candidates.

For the temporal candidate, two positions can be used: the bottom right position of the collocated block (516, denoted H in FIG. 3) and the centre of the collocated block (518). These positions are depicted in FIG. 3.

As for the AMVP motion vector derivation process, a first step aims at checking (520) the availability of the block at the H position. Next, if it is not available, the availability of the block at the centre position is checked (520). If at least one motion vector of these positions is available, the temporal motion vector can be scaled (522), if needed, to the reference frame having index 0, for both list L0 and L1, in order to create a temporal candidate (524) which is added to the list of Merge motion vector predictor candidates. It is positioned after the spatial candidates in the list. The lists L0 and L1 are 2 reference frame lists containing zero, one or more reference frames.

If the number (Nb_Cand) of candidates is strictly less (526) than the maximum number of candidates (Max_Cand that value is signalled in the bit-stream slice header and is equal to five in the current HEVC design) and if the current frame is of the B type, combined candidates are generated (528). Combined candidates are generated based on available candidates of the list of Merge motion vector predictor candidates. It mainly consists in combining the motion vector of one candidate of the list L0 with the motion vector of one candidate of list L1.

If the number (Nb_Cand) of candidates remains strictly less (530) than the maximum number of candidates (Max_Cand), zero motion candidates are generated (532) until the number of candidates of the list of Merge motion vector predictor candidates reaches the maximum number of candidates.

At the end of this process, the list or set of Merge motion vector predictor candidates is built (534). As illustrated in FIG. 5, the list or set of Merge motion vector predictor candidates is built (534) from a subset of spatial candidates (500 to 508) and from a subset of temporal candidates (516, 518).

Figure 6:
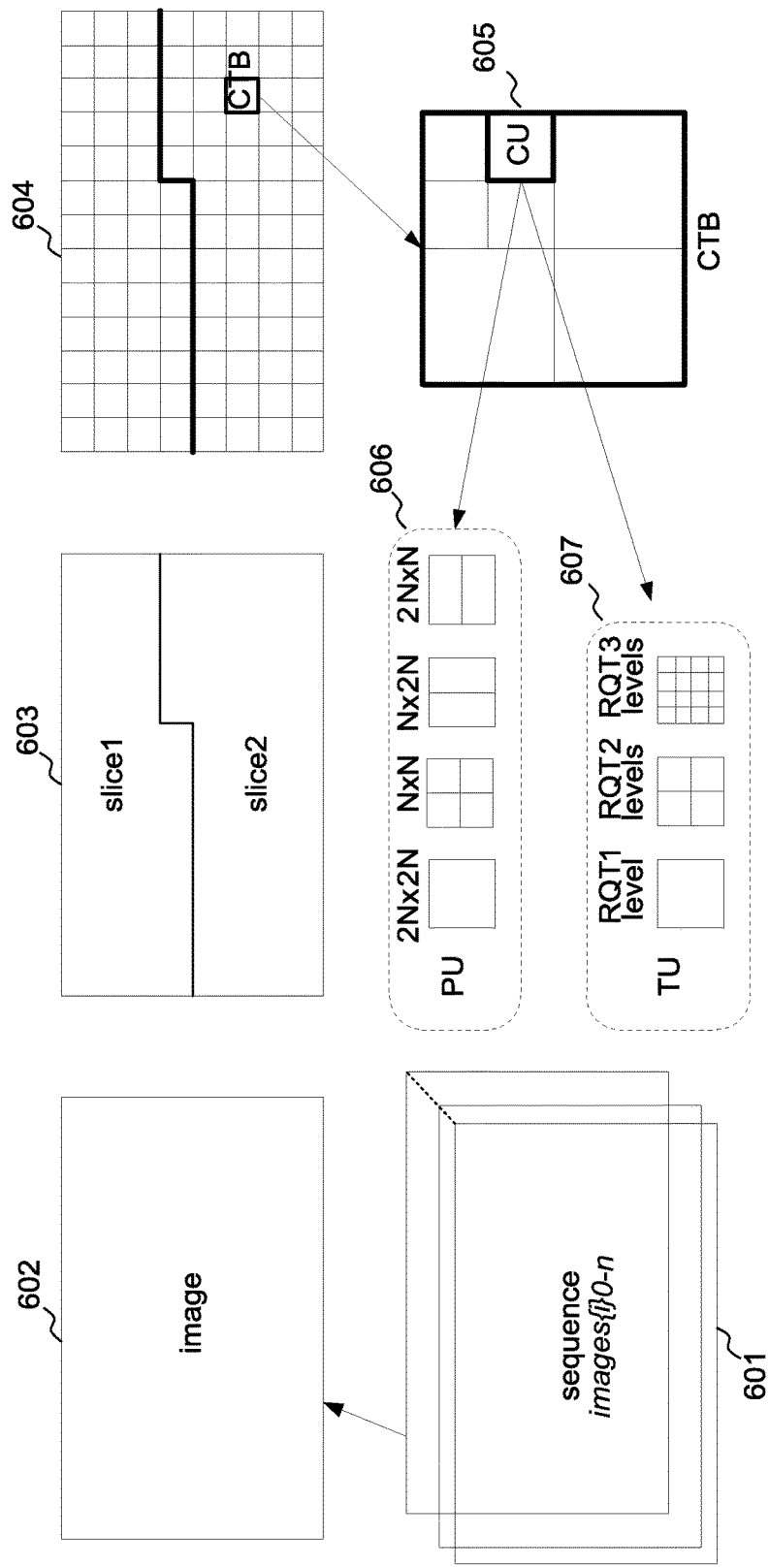
FIG. 6 illustrates the Level decomposition of Video frame.

FIG. 6 shows the coding structure used in HEVC. According to HEVC and one of its previous predecessors, the original video sequence 601 is a succession of digital images "images i". As is known per se, a digital image is represented by one or more matrices the coefficients of which represent pixels.

The images 602 are divided into slices 603. A slice is a part of the image or the entire image. In HEVC these slices are divided into non-overlapping Coding Tree Blocks (CTB) 604, generally blocks of size 64 pixels×64 pixels. Each CTB may in its turn be iteratively divided into smaller variable size Coding Units (CUs) 605 using a quadtree decomposition. Coding units are the elementary coding elements and are constituted of two sub units which Prediction Unit (PU) and Transform Units (TU) of maximum size equal to the CU's size. Prediction Unit corresponds to the partition of the CU for prediction of pixels values. Each CU can be further partitioned into a maximum of 4 square Partition Units or 2 rectangular Partition Units 606. Transform units are used to represent the elementary units that are spatially transform with DCT. A CU can be partitioned in TU based on a quadtree representation 607.

Each slice is embedded in one NAL unit. In addition, the coding parameters of the video sequence are stored in dedicated NAL units called parameter sets. In HEVC and H.264/AVC two kinds of parameter sets NAL units are employed: first, the Sequence Parameter Set (SPS) NAL unit that gathers all parameters that are unchanged during the whole video sequence. Typically, it handles the coding profile, the size of the video frames and other parameters. Secondly, Picture Parameter Sets (PPS) codes the different values that may change from one frame to another. HEVC include also Video Parameter Set (VPS) which contains parameters describing the overall structure of the stream.

Figure 7:
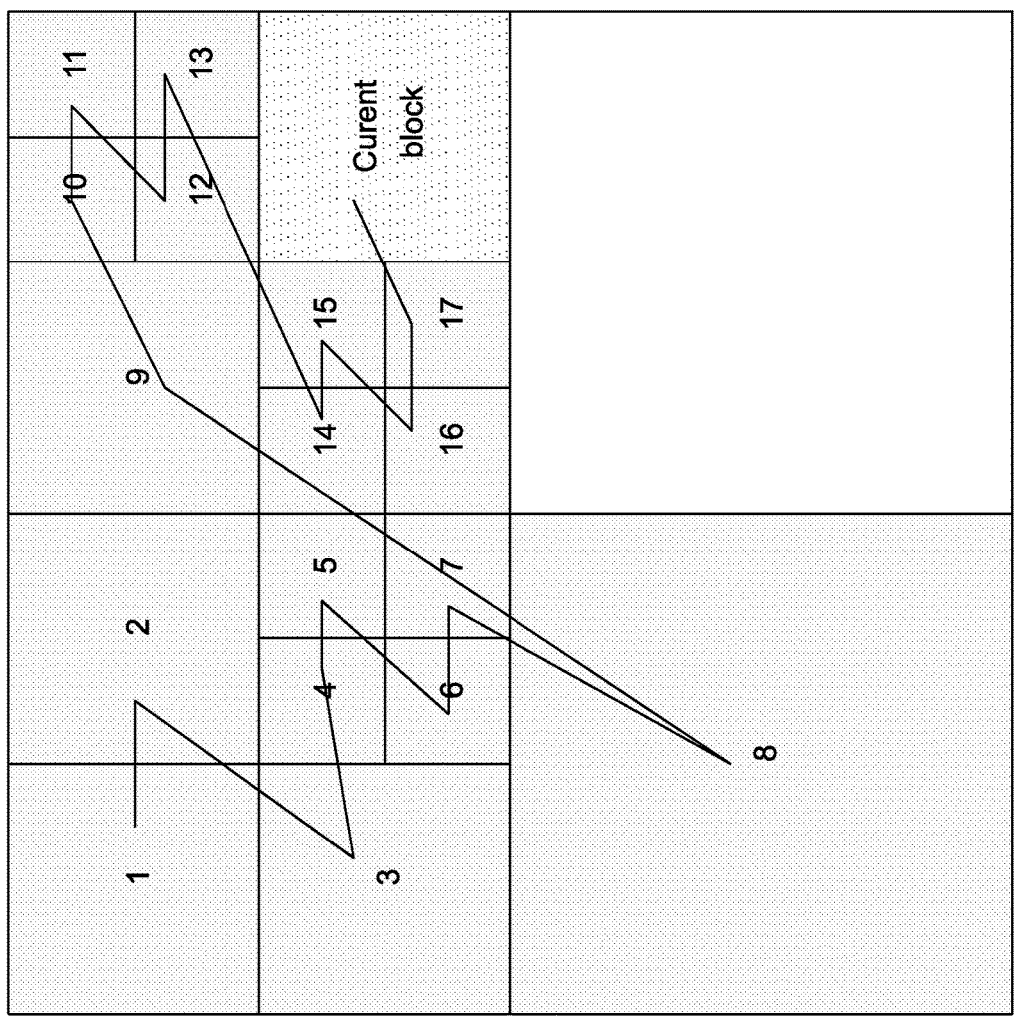
FIG. 7 illustrates the Coding Tree Block splitting in Coding Units and the scan order decoding of these Coding Unit.

FIG. 7 illustrates the Coding Tree Block splitting in Coding Units and the scan order decoding of these Coding Units. In the HEVC standard, the block structure is organized by Coding Tree Block (CTB). A frame contains several non-overlapped and square Coding Tree Block. The size of a Coding Tree Block can be equal to 64×64 to 16×16. This size is determined at sequence level. The most efficient size, in term of coding efficiency, is the largest one: 64×64. Please note that all Coding Tree Block have the same size except for the image border. In that case, the size is adapted according to the amount of pixels.

Each Coding Tree Block contains one or more square Coding Units (CU). The Coding Tree Block is split based on a quad-tree structure into several Coding Units. The coding or decoding order of each Coding Unit in the Coding Tree Block follows the quad-tree structure based on a raster scan order. FIG. 7 shows an example of the decoding order of Coding Units. In this figure, the number in each Coding Unit gives the decoding order of each Coding Unit of this Coding Tree Block.

The INTRA Block Copy (IBC) was added as an additional mode for Screen content coding extension of HEVC. This prediction method is particularly well suited for extremely repetitive patterns. In particular, it is known to help coding graphical elements such as glyphs (i.e., the graphical representation of a character) or traditional GUI elements, which are very difficult to code using traditional intra prediction methods.

Figure 8:
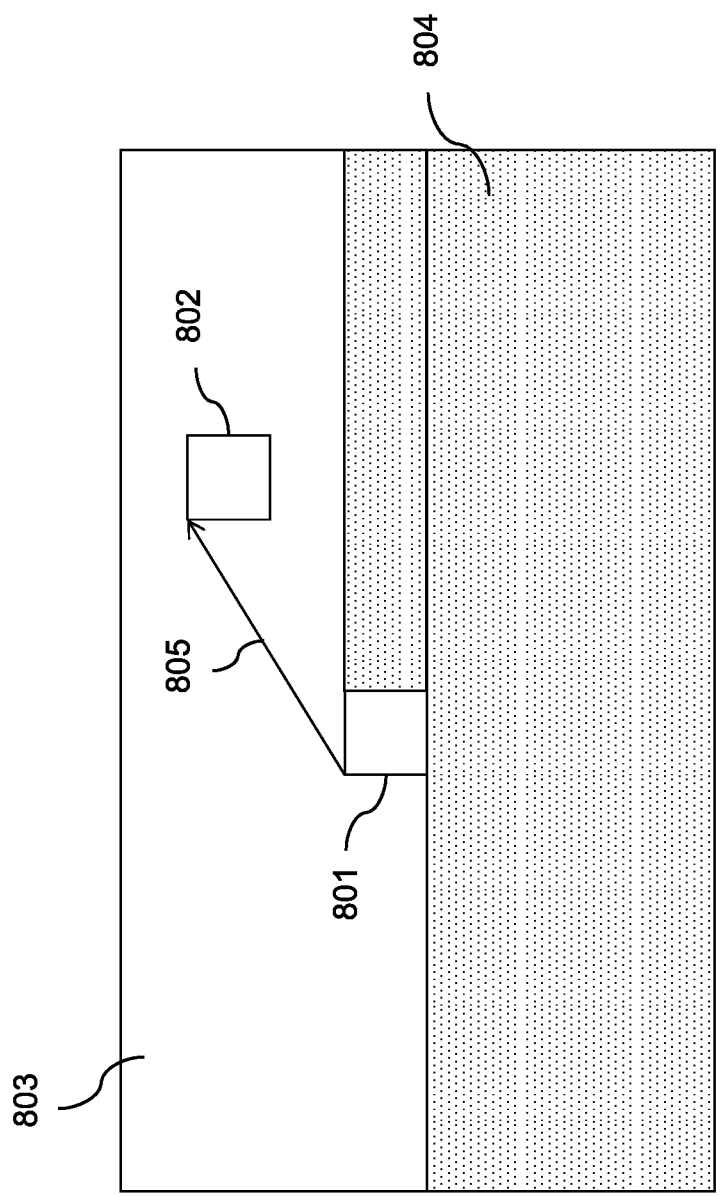
FIG. 8 illustrates the concept of the causal area.

FIG. 8 illustrates how this INTRA Block Copy prediction mode works. For example, this IBC prediction mode substitutes to the whole INTRA prediction mode in the encoder or decoder illustrated in FIG. 1 or 2.

At a high-level, an image is divided into Coding Units that are encoded in raster scan order. Thus, when coding block 801, all the blocks of area 803 have already been encoded, and can be considered available to the encoder. Area 803 is called the causal area of the Coding Unit 801. Once Coding Unit 801 is encoded, it will belong to the causal area for the next Coding Unit. This next Coding Unit, as well as all the next ones, belongs to area 804 illustrated as doted area, and cannot be used for coding the current Coding Unit 801. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks.

INTRA Block Copy works by signalling a block 802 in the causal area which should be used to produce a prediction of block 801. For example, the block 802 may be found by using a matching algorithm. In the HEVC Screen content Extension, this block is indicated by a block vector 805, and is transmitted in the bitstream.

This block vector is the difference in coordinates between a particular point of the Coding Unit 801 and the equivalent point in the predictor block 802. Although it would be possible to use subpixel accuracy as for INTER blocks, this displacement is typically in integer units of pixels, therefore not to require costly subpixel interpolation. This vector is coded in the simplest way currently, the vector is not predicted, and the coordinates are coded using HEVC regular motion vector difference (MVD) coding.

Put in a simple way, the motion vector difference coding consists, for a value d, in coding whether d is zero, and if not, its sign and its magnitude minus 1. In HEVC motion vector difference coding interleaves the x and y components of the vector.

In the current IBC design, each IBC CU can be split into one or 2 PUs as depicted in FIG. 6. For the smallest CU size, 8×8, the CU can be also split into 4 PUs of 4×4 pixels each.

For Inter mode the N×N partition is not available. It means that the 4×4 block size can't be used for Inter mode. The following table summarizes the block size for both modes.

| Block sizes | IBC mode | Inter mode |
| --- | --- | --- |
| 64 × 64 (2N × 2N) | X | X |
| 64 × 32 (2N × N) | X | X |
| 32 × 64 (N × 2N) | X | X |
| 32 × 32 (2N × 2N) | X | X |
| 32 × 16 (2N × N) | X | X |
| 16 × 32 (N × 2N) | X | X |
| 16 × 16 (2N × 2N) | X | X |
| 16 × 8 (2N × N) | X | X |
| 8 × 16 (N × 2N) | X | X |
| 8 × 8 (2N × 2N) | X | X |
| 8 × 4 (2N × N) | X | X |
| 4 × 8 (N × 2N) | X | X |
| 4 × 4 (N × N) | X | |

In the current implementation of INTRA Block Copy prediction mode, the search area depends on the blocks sizes. This is represented in the following table:

| Block size | Full range search (outside the 2CTB area) | 2 CTBs range search | Other |
| --- | --- | --- | --- |
| 64 × 64 | | | No search |
| 32 × 32 | | | No search |
| 16 × 16 | Classical IBC search | Classical IBC search | |
| 8 × 8 | Hash-based | Classical IBC search | |
| 4 × 8 | | Classical IBC search | |
| 8 × 4 | | Classical IBC search | |
| 4 × 4 | | Classical IBC search | |

Figure 9:
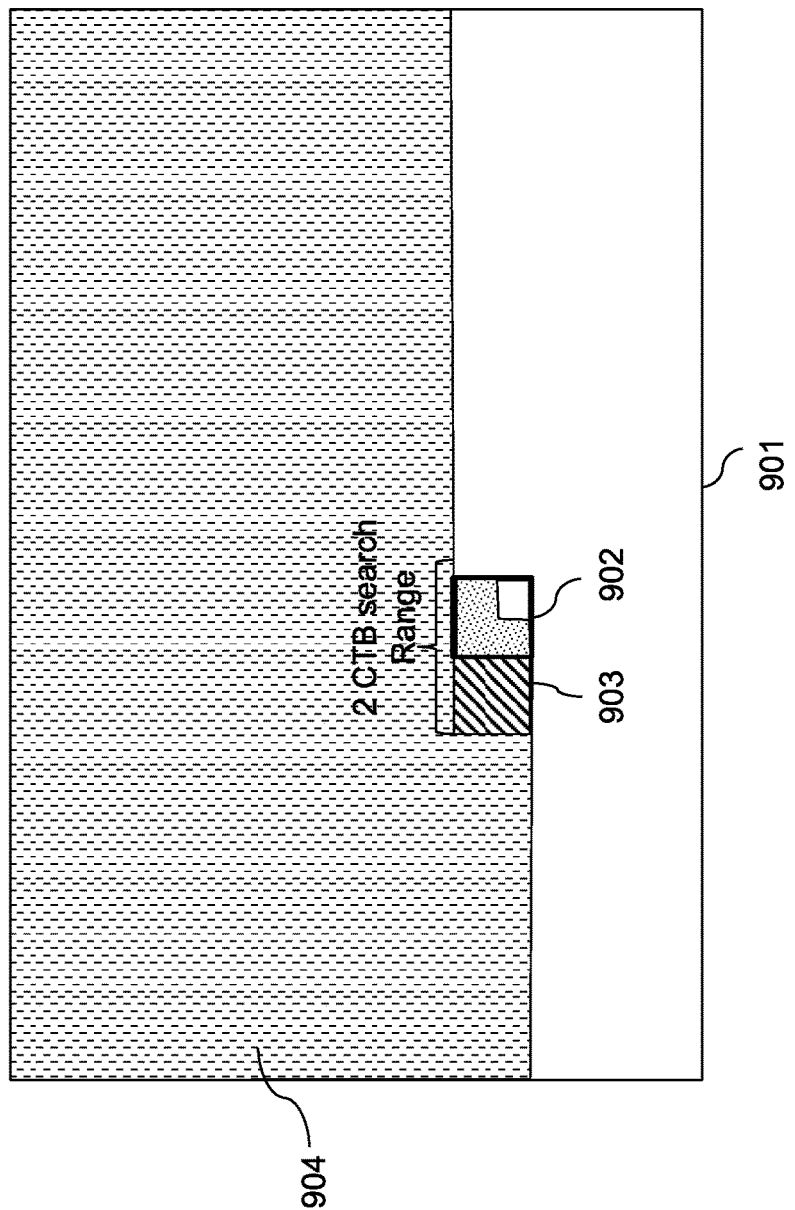
FIG. 9 illustrates the INTRA Block Copy search area.

Please note that the 2N×N and N×2N PU sizes are tested only for 8×8 CUs in the current encoder implementation. These sizes are not depicted in this table. There are 2 types of INTRA Block Copy block vector estimation. The first one is the classical IBC search and it corresponds to a dedicated block matching algorithm. The second one is based on the Hash search algorithm. Two search ranges are also defined. As depicted in FIG. 9, for a frame 901, the two CTBs search range corresponds to the left CTB 903 and to the blocks of the current CTB 902 already encoded. The blocks of current CTB already encoded are depicted in dotted area in FIG. 9. The full frame search corresponds to all the CTBs already encoded 904.

In the INTRA Block Copy mode the "block" vector is the difference in coordinates between a particular point in a block A to encode and the equivalent point in the predictor block D of FIG. 8.

Inventors have noticed that when searching for a good candidate as a predictor block in IBC mode some coherence occur between different coding units. In particular, a block vector selected for a first coding unit proves to be a good candidate for subsequent coding units, whether a neighbour or a sub-CU (i.e. when the current CU is further split in smaller CUs). Given that when searching a block predictor an exhaustive search is generally not necessary, the search may be interrupted when a good enough predictor has been found, beginning the search by testing potentially good candidates is a way to accelerate the search. Indeed, when one of these good candidates is found good enough, some subsequent steps of search may be skipped, leading to the acceleration of the whole encoding process. To carry on this idea, some cache memory may be used in order to memorize block vectors yielding to good predictor blocks in term of distortion. These block vectors are tested first when searching a good predictor block for a subsequent coding unit. Similar cache mechanism may also be advantageously used when searching a good predictor block in INTER prediction modes. In some embodiments, different caches may be dedicated to different sizes of coding units.

Figure 10:
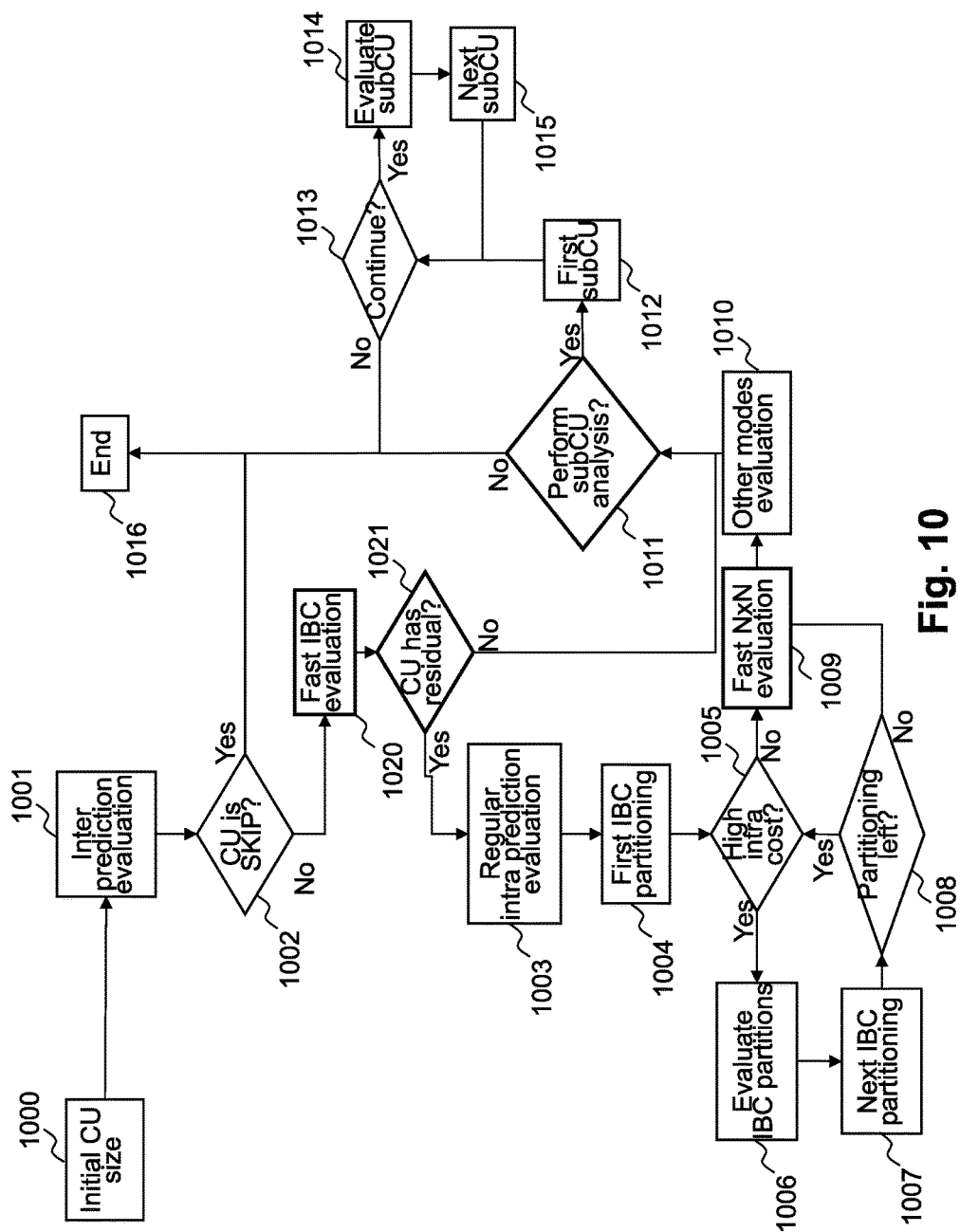
FIG. 10 is a high-level representation of an encoder algorithm featuring the INTRA Block Copy as well as other screen content coding methods.

FIG. 10 is a representation of an encoder, dedicated to the coding of screen content such as graphical interfaces or documents, at an intermediate level, as is known to the man skilled in the art. On step 1000, it initializes the current block by selecting an initial CU size, which may depend on coding parameters such as the maximum block size, or the image dimensions (that may enforce specific sizes on the right and bottom borders of the image). It then first performs inter-frame prediction analysis. This may include evaluating different prediction mechanisms such as SKIP, MERGE or INTER modes, and possibly how to partition the CU. This yields a distortion and an estimated rate for the CU, allowing determining a coding cost measure for the inter-frame coding, such as a Lagrangian cost.

Then, on step 1002, the best coding mode is compared to the SKIP mode. In case SKIP mode is selected, the current CU has been completely analysed and the processing end at step 1016. This allows bypassing the analysis of several modes and thus accelerates the whole processing. Otherwise, inter prediction may not be good enough to encode the current CU, and thus several other modes are going to be tested.

If the CU has residual, then steps 1020 and 1021 occur. They are an embodiment of a means to take into account screen content properties to achieve faster analysis algorithm. In particular, step 1020 performs a fast analysis using preferred BVs. These preferred BVs are further described in FIG. 15. In addition, information gathered during that analysis may be reused for accelerating analysis, e.g. to skip parts (such as the coding rate estimation) or completely terminate the analysis, in particular during step 1006. However, in an embodiment of step 1020, such a piece of information is the distortion measurement: if the distortion is above a threshold that depends on the CU size, the preferred BVs are unlikely to be selected for IBC, and thus their coding rate is not evaluated. On step 1021, if the fast evaluation has fully completed and the CU has no residual, then some intra mode evaluations can be skipped. In the preferred embodiment, this means the processing can skip to step 1010, although another embodiment is to skip to some of the modes evaluated during step 1010.

Therefore, on step 1003, the intra prediction module selects the best classical intra prediction mode based on said coding cost. Typically, angular prediction modes, DC or planar modes are evaluated here, as well as any additional coding parameters, e.g. transform skipping, cross-component prediction and so on. Next, step 1004 starts the evaluation of the screen-content specific modes, by selecting the first partitioning for the INTRA Block Copy method (hereafter IBC), e.g. 2N×2N. Usually, the other partitioning 2N×N, N×2N and N×N are only evaluated if the CU size is 8×8. Before evaluating it, it first checks on step 1005 if the current best intra coding mode cost (including any IBC partitioning evaluated at this point) is high enough to continue evaluation. This is typically done by checking the best intra coding cost against a threshold, that may depend on the modes and partitioning tested so far. If the cost is low enough, classical IBC evaluation is finished and processing continues with step 1009. We call in this document classical IBC mode evaluation the evaluation of Intra Block Copy coding modes without testing first some memorized block vector candidates obtained in the encoding of previous blocks. Instead of continuing with other screen content modes, step 1009 performs a fast evaluation using the N×N partitioning as is done on step 1020: indeed, if either of 2N×N, N×2N or N×N are not evaluated, and the CU is 8×8, then doing a fast N×N evaluation allows to obtain a better trade-off between complexity and coding efficiency.

Otherwise, the partitioning is evaluated by finding the best coding cost for each IBC partition on step 1006, and the next IBC partitioning is selected on step 1007. Then, step 1008 if the last partitioning was evaluated, either going to step 1010 if it is, or to step 1005 otherwise.

As mentioned previously, information from step 1020 can be reused during step 1006. In an embodiment, if the distortion of a particular IBC partitioning is above the best distortion for the preferred BVs, then this partitioning yields no benefit and the coding rate evaluation can be skipped. Identically, if the best encoding parameters for the preferred BVs include coding respectively as RGB or as YCoCg data, then the partitioning reuse respectively coding only as RGB or YCoCg.

Step 1010 evaluates any remaining mode, such as e.g. the palette mode. Then step 1011, evaluates whether to perform subCU analysis. Indeed, the current coding cost may not be good enough, and it may be beneficial to further split the current CU size into sub-CUs that are analysed successively. If it is not the case, then processing ends on step 1016. To the man skilled in the art, a typical condition not do subCU analysis is when the best mode for the current CU is the SKIP mode. In an embodiment, however, another condition is when said mode is instead IBC and the coded block flags are all 0 (i.e., no residual coded). In yet another embodiment, another condition is, in the case that the INTER hash-based has not yielded a good candidate, that the 2N×2N MERGE evaluation yielded a CU of which the coded block flags are all 0 too. That embodiment is better illustrated in FIG. 17.

Step 1012 initializes the subCU analysis by selecting the first sub-CU. Then step 1013 checks whether to continue analysing with the selected sub-CU. The classical embodiment is whether that sub-CU exists (e.g. is inside the image and is allowed according to the coding parameters such as minimal CU size). In another embodiment, the criterion uses the total cost of the sub-CUs encoded so far and the current best cost. In a further embodiment, this is only performed if the current slice is INTRA. In another further embodiment, the criterion is whether said total cost is higher than current best cost. In these embodiments, if the criterion is satisfied, the evaluation is stopped. This behaviour is very rare with classical tools and is not useful with them. However, the tools specific to screen coding such as Intra Block Copy or the palette mode may have significant cost increase when splitting the CU into sub-CUs, so it is often worth checking.

If it is not the case, the coding of the sub-CUs is finished, and their total coding cost allows deducing if coding sub-CUs is the best coding mode. The processing therefore ends on step 1016. If the sub-CU exists, step 1014 evaluates its coding mode. It is basically a recursive coding, corresponding to FIG. 10 with step 1000 starting with the sub-CU as initial CU. Now that the current sub-CU has been evaluated, the next sub-CU is selected on step 1015, and the processing loops back to 1013.

The fast evaluation works as long as good BVs for predictors are provided. In order to do so, classical INTER search methods are not as effective. Instead, a caching system can be put in place: the BVs found during each occurrence of step 1006 of FIG. 10 for a given PU can be reused for either a different partitioning, or during step 1014 (and more specifically when step 1006 occurs again). In one embodiment, these BVs are placed in a cache system, where previous good BVs are stored. Advantageously this cache stores only unique BVs, meaning that it is taken care of that a given BV is not stored twice in the cache, so as to reduce memory usage and reduce redundant operations when retrieving and evaluating BVs.

Figure 11:
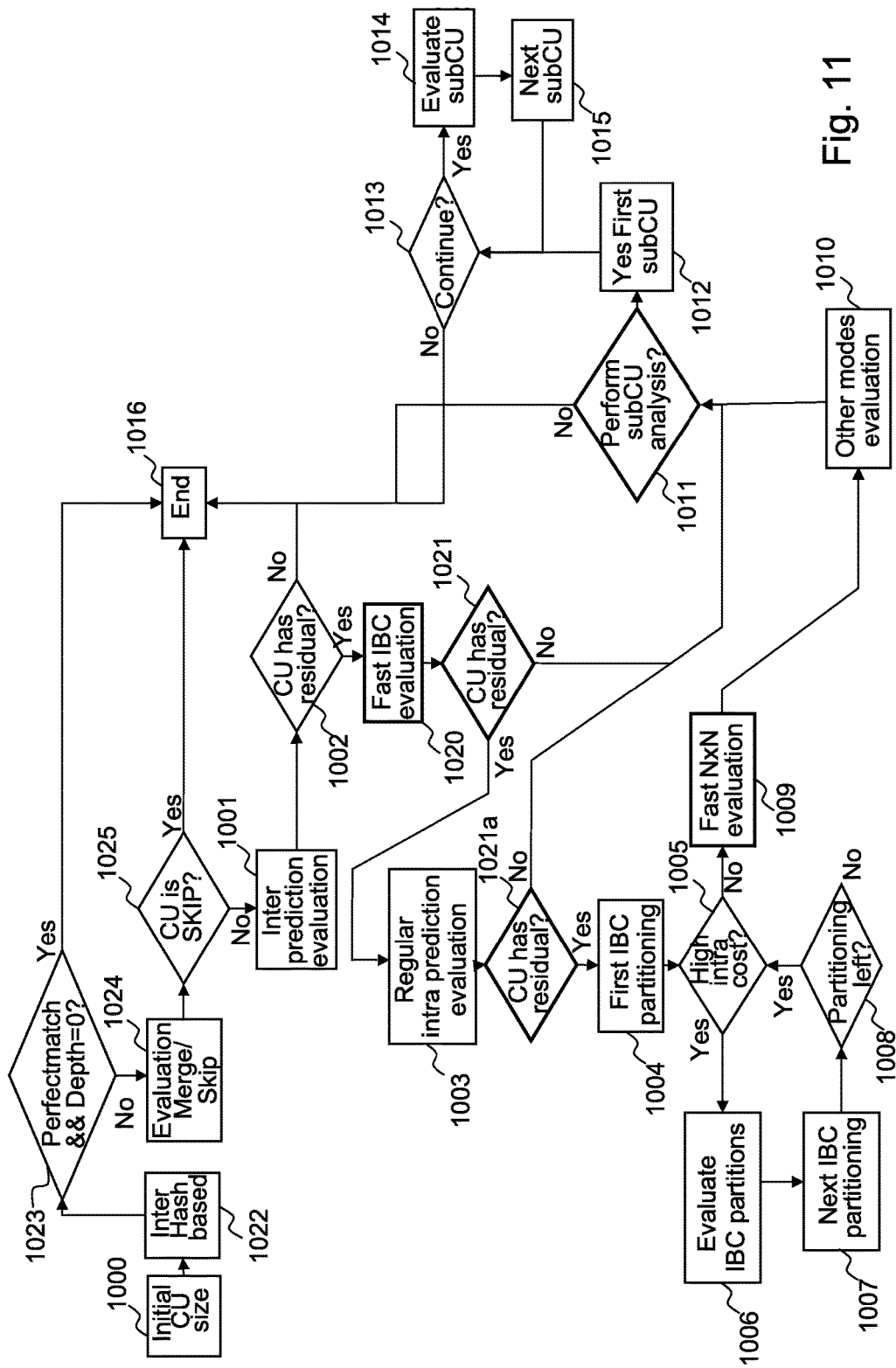
FIG. 11 illustrates a variant of FIG. 10.

FIG. 11 illustrates a variant of FIG. 10 in which references designing similar modules have been kept identical.

In a step 1022, the encoder checks the RD cost of the Inter Hash search. This algorithm consists in looking for the blocks in the reference frames list which have the same content based on a hash classification. This corresponds to a coding mode called Inter hash based coding mode. If the block has a "perfect match" and if the CU depth is 0 tested in step 1023, then the mode estimation is ended in step 1016. This allows bypassing the analysis of several modes and thus accelerates the whole processing. A perfect match is considered true only if the quantization parameter of the corresponding block is less than the quantization parameter of the current block.

Then the Merge coding modes and the Skip coding modes are evaluated in step 1024. If the best mode among all possible coding modes tested is the Skip mode in step 1025, then the current CU has been completely analysed and the processing ends at step 1016.

Otherwise, the algorithm evaluates the Inter prediction with all sub-partitions 1001. If the Best mode has no residual, tested in step 1002, then the current CU has been completely analysed and the processing ends at step 1016.

After Intra evaluation step 1003, if there is no residual, tested in step 1021*a*, then the process ended by going to step 1011 to perform subCU analysis.

It is worth noting that this embodiment consists in considering the evaluation of Inter mode 1001 in priority, followed by the evaluation of fast IBC 1020, and next the evaluation of Intra mode 1003. Following each evaluation, a test is carried on to terminate the evaluation if a block predictor leading to no residue has been found.

In a first embodiment of the invention, the evaluation of Inter coding modes and fast IBC coding modes are conducted at the same level without any residue-test between them. A residue-test is a test to determine if so far a predictor block of pixels has been found during the evaluation leading to an encoding of the current block of pixels without residue. These two evaluations may be conducted in any order. They may or not be followed by the evaluation of other coding modes.

Figure 12:
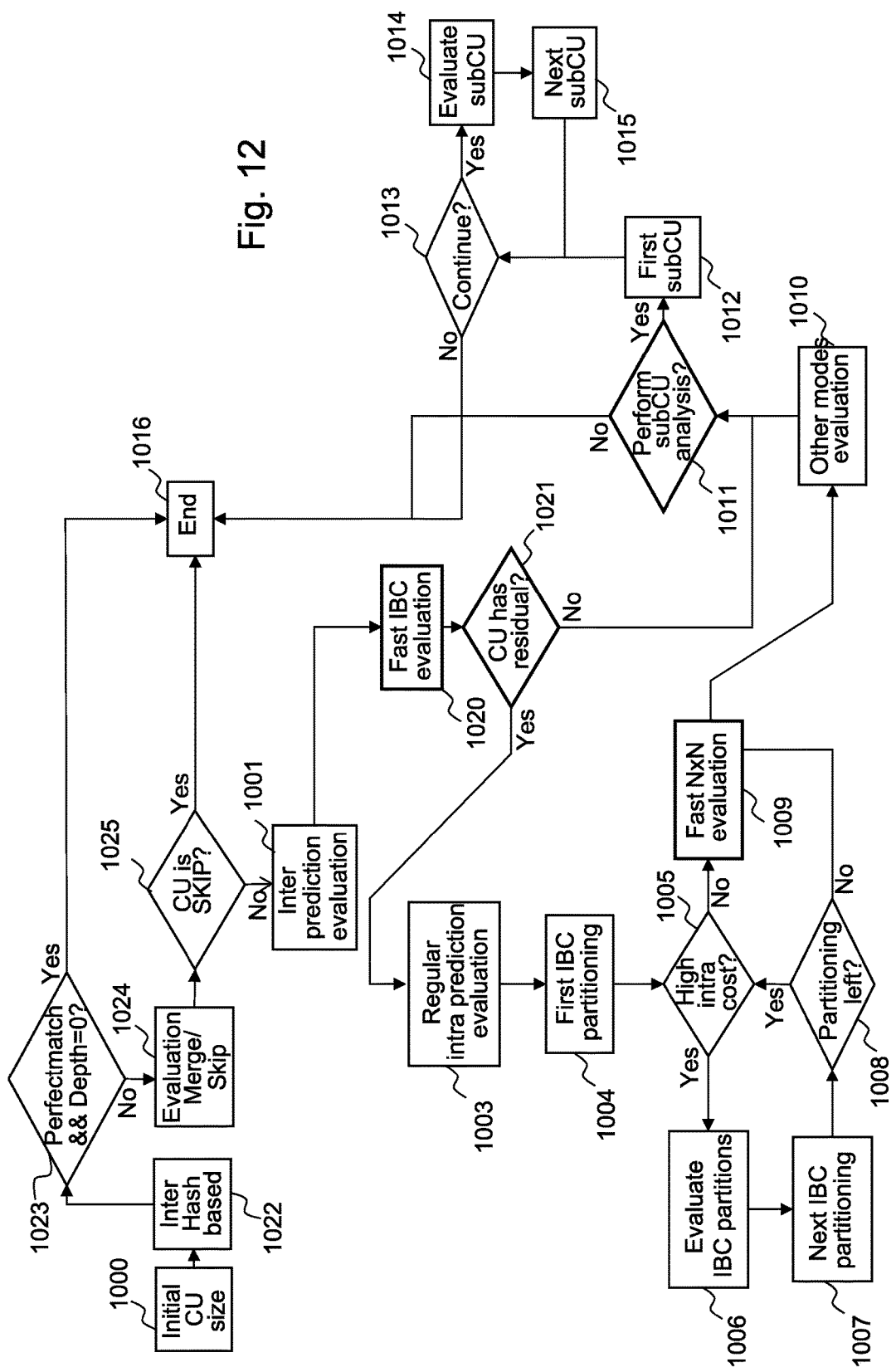
FIG. 12 illustrates an advantageous variant of FIG. 11 in an embodiment of the invention.

FIG. 12 illustrates an example of this first embodiment. In this embodiment, the evaluation of the IBC mode is considered as the same level as the evaluation of the Inter mode in the mode selection process. Compared to FIG. 11, the decision module 1002 has been removed. In that case, even if no residual has been obtained with the Inter mode, the fast IBC mode is evaluated. It means that if the Inter mode is tested in step 1001 (if the CU mode is not SKIP or MERGE or an INTER mode selected with the Hash search step 1025) the fast IBC evaluation is processed.

In another embodiment of FIG. 12 keeps the same order in the evaluation of Inter modes 1001, fast IBC mode 1020 and Intra mode 1003, but only one test 1021 is done to see if a predictor block leading to no residue has been found. Only one opportunity for an early termination of the evaluation is given after the evaluation of the fast IBC mode evaluation. This means that Inter evaluation and fast IBC are evaluated at the same level while Intra and classical IBC, 1004 and following steps, are also evaluated at the same level.

This embodiment may be advantageous considering that, in the case of screen content, the IBC mode is likely to give the best encoding results even if the Inter mode has given a "good" result.

In a second embodiment, the Skip coding mode is evaluated first and next the fast IBC coding modes are evaluated if the Skip mode has not been selected. These evaluation may or not be followed by other coding modes evaluations.

Figure 13:
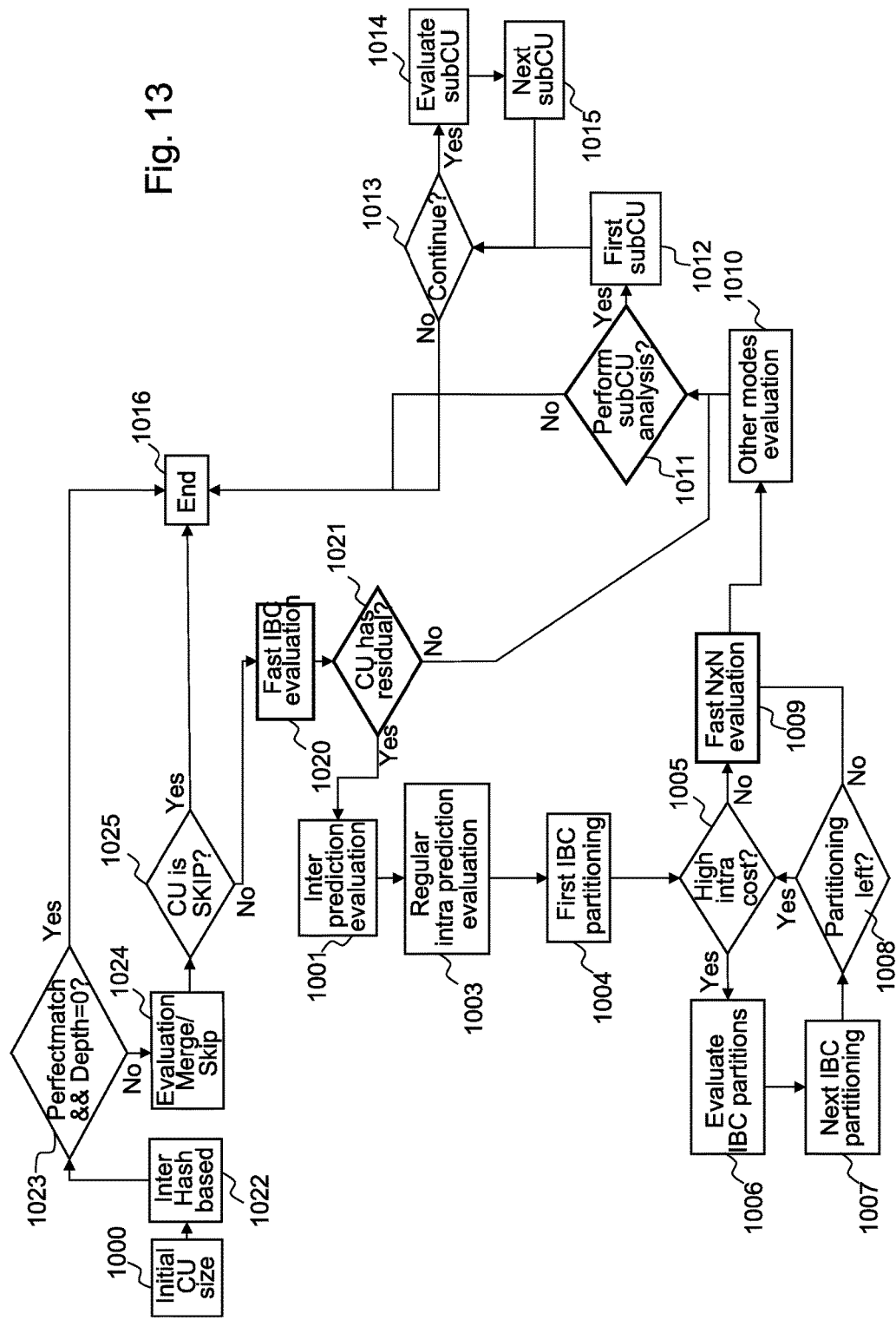
FIG. 13 illustrates another advantageous variant of FIG. 11 in an embodiment of the invention.

FIG. 13 illustrates an example of this second embodiment. In this example, fast IBC evaluation is done before Inter and Intra evaluation. If a predictor block with no residue is found during this evaluation the search is terminated using step 1021. If not the evaluation process continues with Inter evaluation 1001, Intra evaluation 1003 and so on.

As a variant, in another variant of this embodiment, fast IBC could also be considered as the same level as Inter mode. Compared to FIG. 13, the decision module 1021 is removed. In that case, even if no residual has been obtained with the Intra mode, the evaluation of the IBC mode is processed. In this embodiment, Inter, fast IBC, Intra and classical IBC are evaluated at the same level.

In another variant, Fast IBC is evaluated and if a residual has been obtained with fast IBC, Intra and classical IBC are evaluated at the same level. This variant is particularly useful for Intra images ("I") where there is no interest in evaluating Inter modes.

In another variant of this second embodiment, the Inter prediction evaluation in step 1001 is removed. Indeed, the Inter hash based evaluation 1022 is considered as sufficient for evaluating the Inter prediction mode. In that case the Fast IBC evaluation is performed if the best mode was not the Skip mode 1025.

Figure 14:
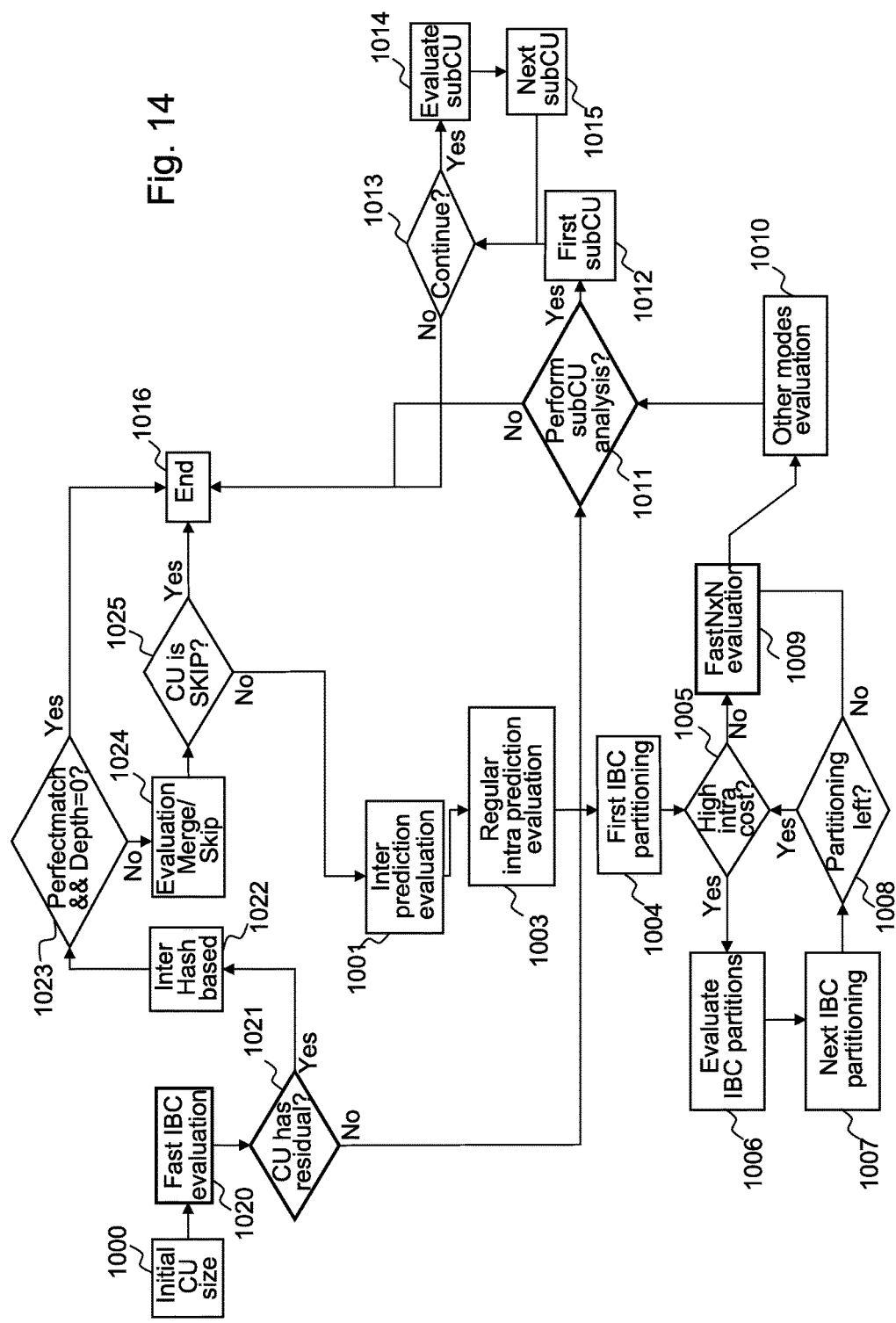
FIG. 14 illustrates yet another advantageous variant of FIG. 11 in an embodiment of the invention.

In a third embodiment, an example of which being illustrated in FIG. 14, the fast IBC evaluation is evaluated before any other potential evaluation. In the example, it is followed by the Inter Hash evaluation for the CU mode selection 1020. In the embodiment depicted on FIG. 14, the following modes are evaluated only if the best IBC mode has a residual (arrow "Yes" after block 1021 depicted in FIG. 14).

In some variants of this embodiment, test bloc 1021 is suppressed and the following evaluations are systematically done.

In yet another variant of the embodiment of FIG. 14, the fast IBC evaluation is evaluated before the Merge/Skip evaluation for the CU mode selection (the steps order would be 1000, 1022, 12023, 1023 if "No", 1021 and 1024 if "Yes"). In this case, the fast IBC evaluation may or not be followed by a test bloc 1021 to skip following evaluation in case a CU has been found with no residue.

In a variant that could apply to all previous embodiments the fast IBC evaluation contains a larger evaluation including sub-partitioning and CU size evaluation as well as careful search position.

In another variant that could apply to all previous embodiments, these different encoder algorithms can be applied for some specific CU size 1000 and not for all sizes.

In yet another variant that could apply to all previous embodiments, the module 1021 points to the module 1016 instead of pointing to module 1011 if the CU has no residual.

Figure 15:
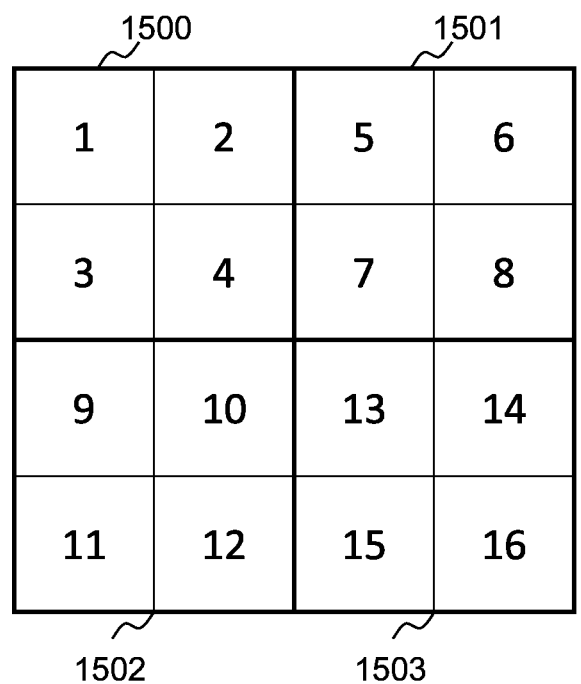
FIG. 15 illustrates topological properties of the cache system of an embodiment of the current invention.

FIG. 15 better illustrates a first advantageous property of said cache system. The block in FIG. 15 is a 64×64 CU with 16×16 sub-CUs in their coding order, numbered 1 to 16. Sub-CUs 1500 to 1503 are 32×32 sub-CUs. Let us imagine a cache system for a 64×64 CU, storing a number of best BVs found in each of the 16×16 sub-CUs. When evaluating the next 64×64, the cached good BVs can be obtained from the cache for neighbouring 16×16 sub-CUs:

When evaluating a 64×64 CU (actually a CTB), the good BVs on top (but is unavailable because not in the previous CTB, as it belongs to a different CTB line and thus analysed much earlier) and on left of it are useful, so good BVs for sub-CUs 6, 8, 14 and 16 are useful;

When evaluating the 32×32 CUs, the good BVs can be retrieved from the 2 top and 2 left 16×16 CUs, as well as the top-left, top-right and bottom-left if available:
For 1500: 6 then 8 then 14;
For 1501: 2 then 4;
For 1502: 14, 16, then 3, 4 then 6;
For 1503: 10, 12, then 7, 8, then 4.

A 16×16 sub-CU has a top (except 1, 2, 5 and 6) and a left 16×16 sub-CU neighbour, as well neighbours in the corners
As an example, 16×16 sub-CU 15 can use its left neighbour 12, its neighbour above 13, then the corner neighbours 10 and 14;
Another example is 1, which can use 6 and 8.

Ideally, the good BVs of each sub-CUs are then retrieved and put in another cache where they are unique: indeed, redundant BVs at this stage can cause superfluous evaluations and further cache pressure when storing the found good BVs back into the cache. It is obvious to the man skilled in the art how this cache system can be possibly extended to use higher granularity (e.g. for each 8×8 sub-CU). However the benefits here quickly reach a maximum, and in an embodiment, this caching system is used to test large CU sizes (larger than 16×16) which were not evaluated in the prior art, because the trade-off between coding gain and complexity was too low.

FIG. 15 can be further used to present another level of caching: when not evaluating cached good BVs, evaluation, e.g. during step 1006, of sub-CUs 1500 to 1503 can yield new good BVs. These BVs can be kept in a cache system for use again in 1006 for a different partitioning, but also during step 1014, when either step 1020 or 1006 for the sub-CU. An illustration of this, is that the evaluation of 16×16 sub-CUs 1 to 4 on steps 1020 and 1006 can use the new good BVs found for CU 1500. The same applies for sub-CUs 5 to 8 and 32×32 CU 1501, and so on.

Figure 16:
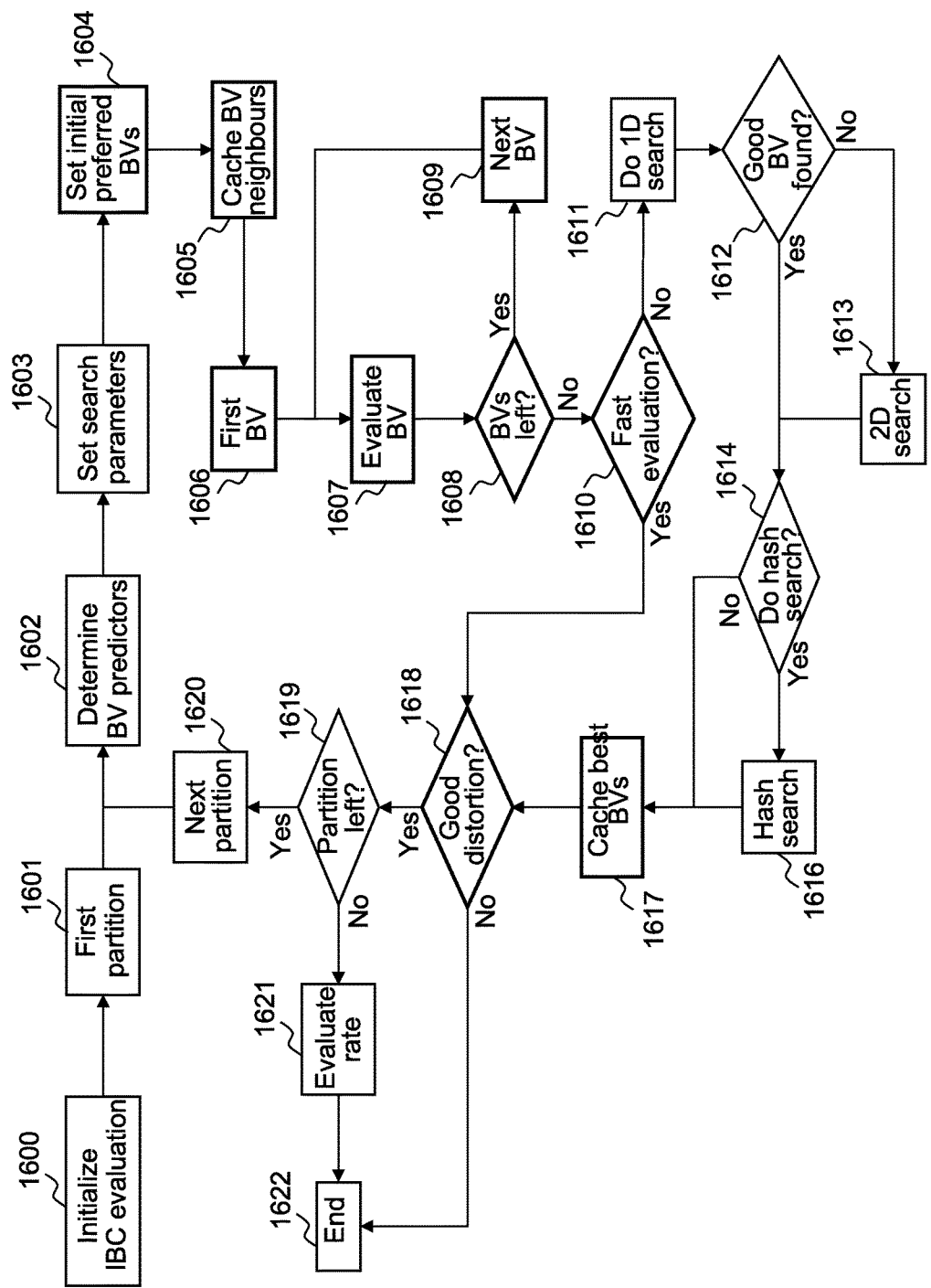
FIG. 16 illustrates an INTRA Block Copy search algorithm embedding parts of an embodiment of the current invention.

Now that we have illustrated the properties of the cache system (from which CU, and for which CU it can be used), FIG. 16 can better illustrate how the cache system is used and what is occurring during step 1006, as it conditions what occurs on steps 1020 and 1009. There are basically 4 types of evaluation performed: cached BVs evaluation as introduced by the invention (steps 1604 to 1610), 1D search (step 1611), 2D search (1613) and hash search (step 1616). In addition, when evaluating a BV, a number of best BVs for the current PU are accumulated. This is traditionally done because the evaluation is only performed on the first component, and as usual step 1600 initialises the IBC evaluation. In an embodiment of the invention, in particular, partitions of type N×2N are favoured over those of type 2N×N, by allowing and performing full-frame 1D search for the former, and disallowing altogether 2D search for the later. Then step 1601 initializes the CU evaluation by selecting first partition. This allows determining the BV predictors for current partition on step 1602, and setting the search parameters on step 1603. Typically, this enforces the causal requirements for the predictor, as well as restrains the search area to e.g. the slice or tile. In addition, this may set different search windows for different CUs or partitioning: for instance, 16×16 CUs can search all of the causal area of the frame during step 1613, while 8×8 CUs will have be restricted to the 2-CTB-wide area of FIG. 9.

Cache BV evaluation starts on step 1604. As mentioned, CU of size 64×64 to 32×32 will ideally retrieve the cached BVs from their neighbours as explained in FIG. 15. For a 2N×2N 8×8 sub-CU, this will retrieve the cache BVs found when analysing its corresponding 16×16 CU. For an 8×8 sub-CU of different partitioning, the cached BVs for the previous partitioning can be retrieved. In an embodiment, these multiple sources of good BVs are merged so as to produce a list of unique BVs. Step 1605 then add the BVs indicated by the actually selected BVs of neighbouring CUs. In an embodiment, this also includes adding the temporally collocated CU BVs from a neighbouring frame: indeed, it may be also be a good BV. Now that the list of unique BVs has been built, the first BV is selected on step 1606. Step 1607 then evaluates the current BV, and if there is no BV not evaluated in the list on step 1608, then cached BV evaluation terminates on step 1610, otherwise the next cached BV is selected on step 1609 before going back to step 1607. Step 1610 checks whether a fast evaluation is occurring, as may happen on steps 1020 or 1009 of FIG. 10. If it is the case, the PU has been evaluated and processing continues to step 1618, otherwise step 1611 occurs.

Step 1611 performs a 1D search: BVs having the same ordinate or same abscissa as the PU within the search area are evaluated. A further embodiment uses ordinates deduced from the cached BVs to define other lines to explore and is further detailed in FIG. 19. As mentioned on step 1600, in an embodiment, N×2N partitions use the full width and full height, compared to other 8×8 partitioning. This is followed by step 1612: if a good BV has not been found, then 2D search occurs on step 1613, otherwise this 2D search is skipped. The 2D search can use any techniques to scan the search area. One such technique is to first scan BVs of even ordinates, then BVs of odd ordinates and, first even abscissae, then odd abscissae. Then step 1614 checks whether hash-based search can occur, i.e. if the CU is 8×8 and its partitioning is 2N×2N (in which case this is the first and only PU of the CU). If it is the case, then hash search occurs on step 1616, otherwise processing continues to step 1617.

Step 1617 is an embodiment of the cache system: at this point, a number of best BVs have been found, possibly originating from steps 1604 to 1609. These best BVs are then stored in the cache for current CU. This means for a 16×16 CU, the cache system presented in FIG. 15, and for an 8×8 CU, the cache system for the current CU. In any case, the best BVs are added to these caches only if they are not already present. This means that each block vector stored in the cache memory is stored once and only once. Then, as previously mentioned, the distortion of a CU during a particular analysis can be reused. Step 1618 performs this in two ways. First, if this is fast evaluation, the current sum of the best distortions for each partition is compared to a threshold depending on the CU size: if it is too high, fast evaluation is interrupted, and any rate evaluation is not performed by going to step 1622 and ending processing. This is done mostly in reference to FIG. 10, where it may cause a CU with no residual yet low quality on step 1021, therefore causing step 1011 to skip directly to step 1016 without doing the necessary sub-CU analysis. In another embodiment, if the sum is above a particular threshold, ideally obtained from the one yielded by step 1020, then again the CU evaluation is aborted. In the case it is not aborted, then step 1619 checks whether there is any partition left. If there is, the next partition is selected on step 1620 before the evaluation loops back to step 1602. If there is not, the PUs all have been evaluated, and the rate estimation for the whole CU can occur, so as to determine the coding cost and thus determine if the current partitioning is the best for the CU.

Figure 17:
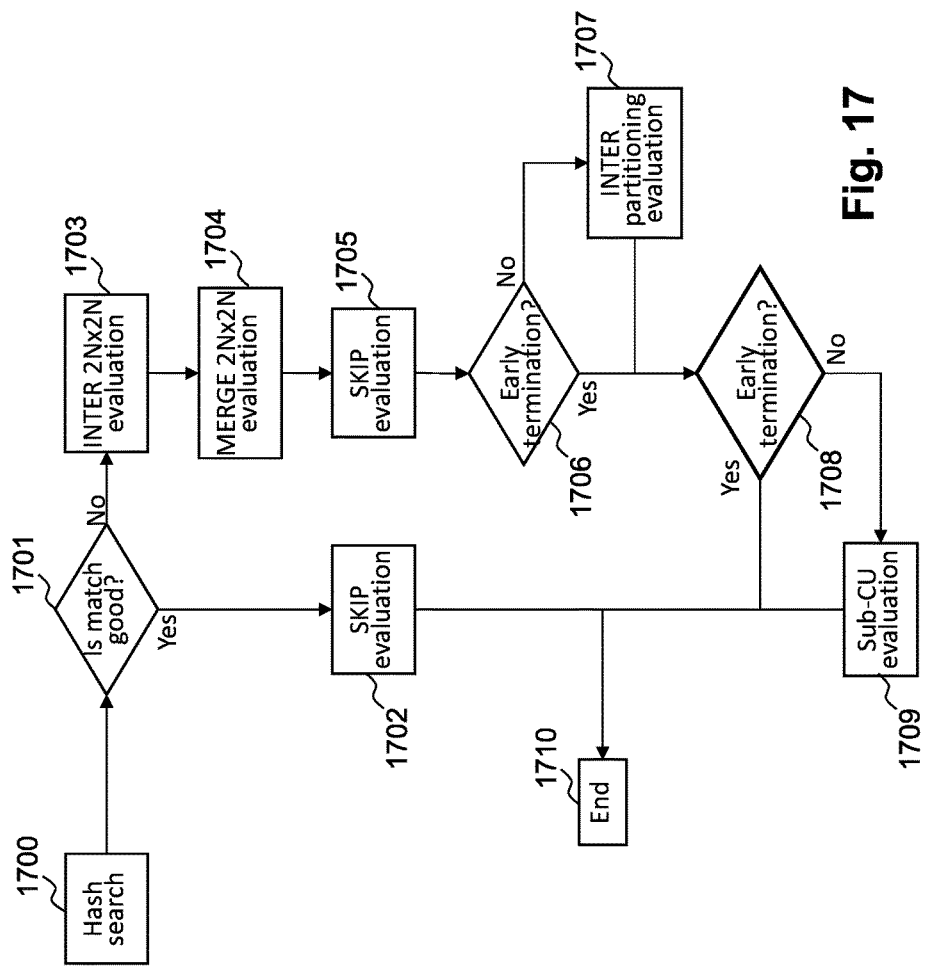
FIG. 17 illustrates an improved Inter search algorithm following parts of an embodiment of the current invention.

In a further embodiment, the INTER mode has an equivalent caching system, separated or not from the IBC one. Indeed, in some cases, some BVs found in one can be used in the other, i.e. the caches communicate. However, the biggest cause for runtime increase is the condition in step 1011. FIG. 17, which is located inside of step 1001 in FIG. 10, allows presenting how inter-frame prediction evaluation can be modified to achieve this. On step 1700, a hash-based search tries to find a good prediction for the current CU (partitioned as 2N×2N). Then step 1701 checks whether the prediction is good enough. This is evaluated in the prior art by checking if the quantization parameter of the reference frame (or the slice the prediction belongs to) of the prediction found by the hash-based search is lower than current frame (or the slice of the current CU) and if the CU is big enough. If it is good enough, only the SKIP evaluation is performed on step 1702, and the full inter-frame evaluation is terminated on step 1710. Incidentally, as the selected mode is SKIP, this also ends all analysis for the current CU. If the prediction is not good enough, then the classical 2N×2N INTER mode is evaluated on step 1703. It is followed by the 2N×2N MERGE mode evaluation on step 1704 and the SKIP mode evaluation on step 1705. Step 1706 then checks whether the INTER partitioning modes should be evaluated, based on the coded block flags of the current best mode. If they can be then steps 1707 performs their evaluation.

In all cases, step 1708 occurs which is the same test than 1706. In the prior art, because the match was not good enough on step 1701, sub-CU evaluation was always performed. However, the condition in 1701 is too lenient for screen content, and sub-CUs are better evaluated only if the best mode from steps 1703 to 1705 actually has residuals. Therefore step 1708 performs that check, allowing to skip sub-CU evaluation on step 1709 (placed here for convenience, as it is actually step 1011 from FIG. 10). This concludes the INTER modes evaluation, which then ends on step 1710.

Figure 19:
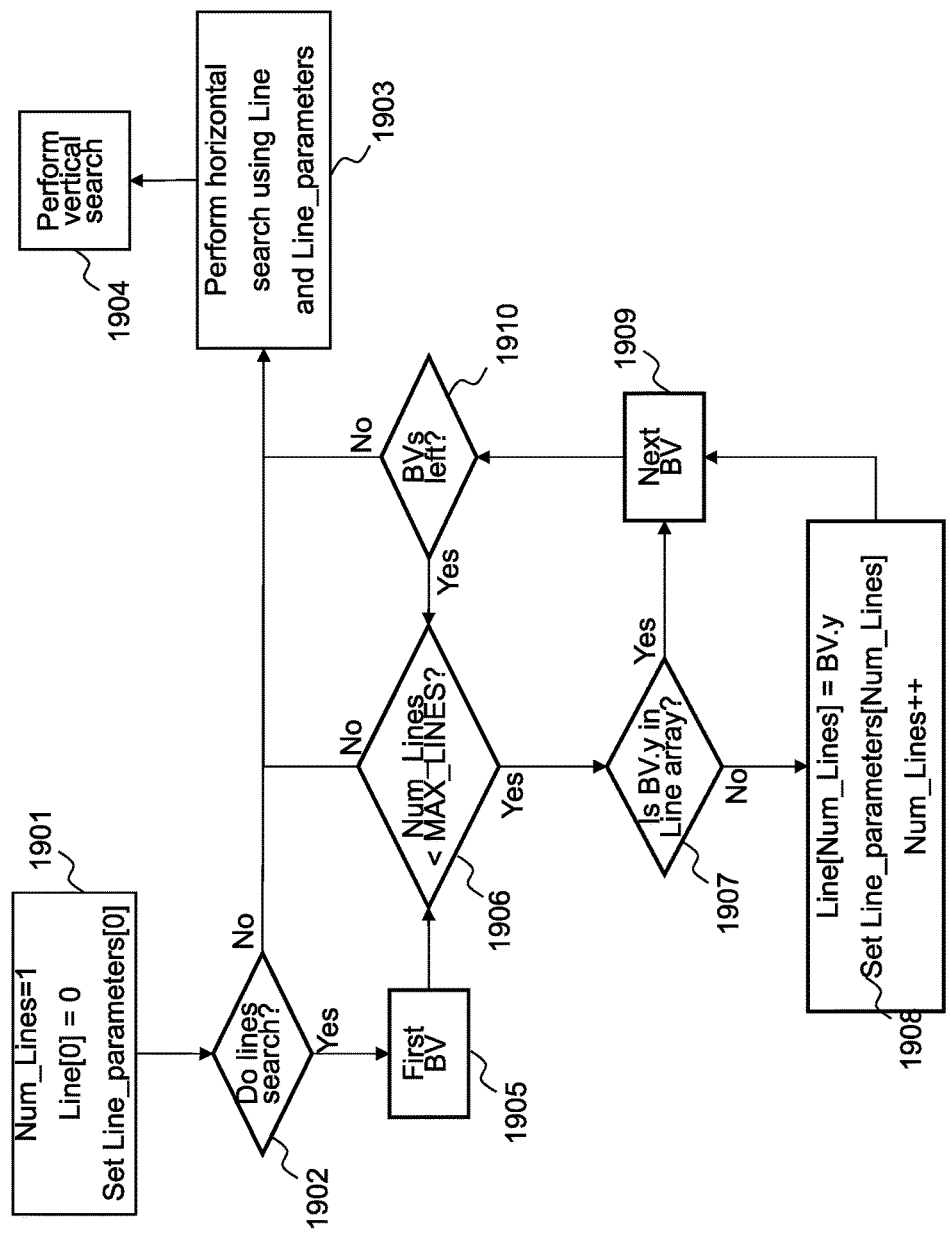
FIG. 19 illustrates how the horizontal 1D search can be modulated for screen content.

FIG. 19 illustrates a further improvement of the 1 D search using the cache system. As already embodied with the increase of the 1 D search range increase for the 2N×N PUs, Intra Block Copy is particularly efficient at copying patterns but also glyphs. For instance, the words 'pattern', 'palette' or 'indeed' have common letters, appearing on the same line. Therefore it is advantageous to explore the lines pointed at by the cached BVs, beyond the one of the current PU. Let us therefore make the 1D search a bit more generic and define the following elements: a number of lines 'Num_Lines' to explore, with said lines ordinates (relative to the PU ordinate in the following) contained in the array 'Line' (first ordinate is Line[0], second one is Line[1] and so on) and search parameters for each line in array Line_parameters. Each of the arrays has a maximal size named MAX_LINES. So, ordinate line[i] will have a search controlled by Line_Parameters[i] parameters. Those parameters can be the search range (16×16 uses the full width as well as 2N×N PU, while other PUs are restricted to a smaller area), but also the search pattern (e.g. do even abscissae then odd ones) and so on. Traditionally, step 1901 therefore initialises the 1D search by setting the number of lines Num_Lines to 1, the first line to explore at the relative ordinate 0 (i.e. same line as the PU) and the appropriate search parameters expected.

Step 1902 constitutes the first novel step in this figure. It checks whether other lines should be explored. Such an embodiment is to do this for the 16×16 CUs, as this will provide further good BVs for its sub-CUs. If it is not the case, step 1903 executes the horizontal search on the specified lines (1, of relative ordinate 0 in the prior art).

Otherwise, the novel search is employed. It selects first BV from the cache on step 1905, and checks whether the number of lines to explore has reached its maximum MAX_LINES on step 1906. If it has, then all lines have been defined and processing continues with step 1903. Otherwise, the ordinate pointed at by the selected BV is compared to the ones in the 'Line' array. If it is already present, then step 1909 occurs, otherwise the ordinate pointed at is added to the 'Line' array on step 1908. This steps further sets the search parameters for said line and updates the number 'Num_Lines' of lines to explore. Then step 1908 selects the next BV in the cache. Step 1910 checks if there is none, going to step 1903 if it is the case, otherwise looping back to step 1906.

Figure 18:
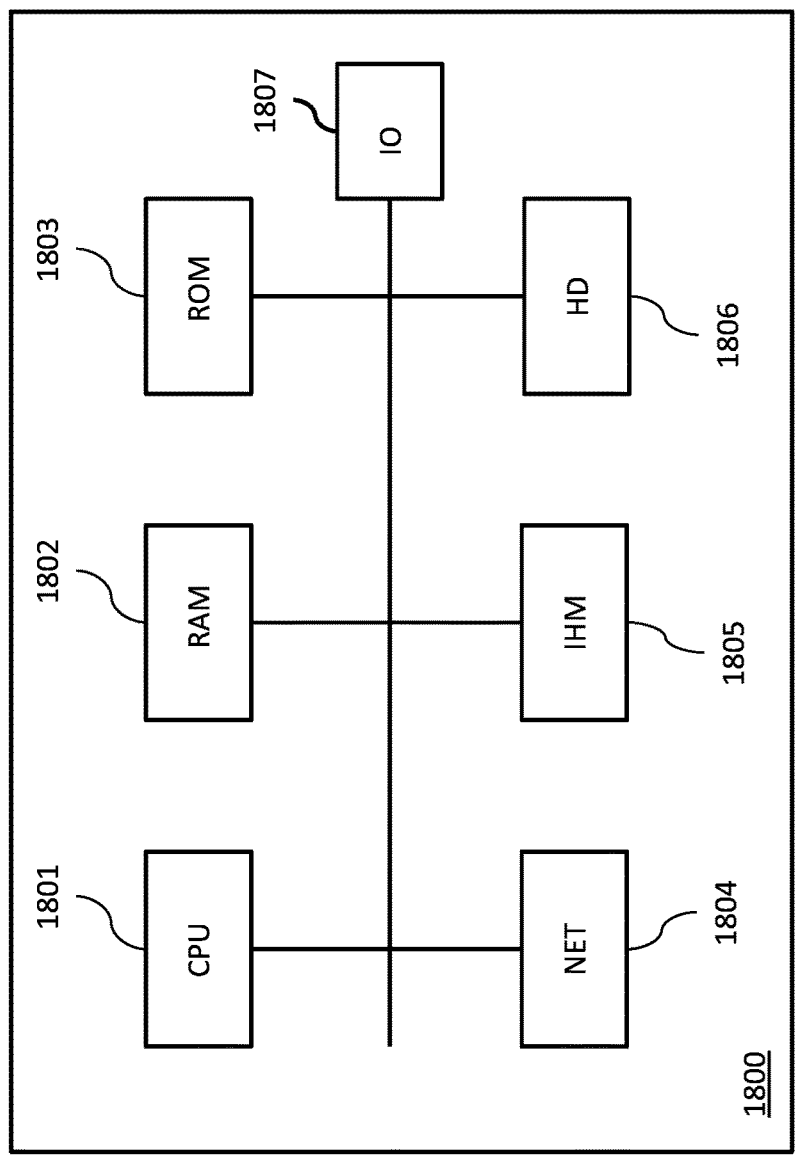
FIG. 18 is a schematic block diagram of a computing device for implementation of one or more embodiments of the invention.

FIG. 18 is a schematic block diagram of a computing device 1800 for implementation of one or more embodiments of the invention. The computing device 1800 may be a device such as a micro-computer, a workstation or a light portable device. The computing device 1800 comprises a communication bus connected to:

- a central processing unit 1801, such as a microprocessor, denoted CPU;
- a random access memory 1802, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 1803, denoted ROM, for storing computer programs for implementing embodiments of the invention;
- a network interface 1804 is typically connected to a communication network over which digital data to be processed are transmitted or received. The network interface 1804 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1801;

a user interface 1805 may be used for receiving inputs from a user or to display information to a user;

a hard disk 1806 denoted HD may be provided as a mass storage device;

an I/O module 1807 may be used for receiving/sending data from/to external devices such as a video source or display.

The executable code may be stored either in read only memory 1803, on the hard disk 1806 or on a removable digital medium such as for example a disk. According to a variant, the executable code of the programs can be received by means of a communication network, via the network interface 1804, in order to be stored in one of the storage means of the communication device 1800, such as the hard disk 1806, before being executed.

The central processing unit 1801 is adapted to control and direct the execution of the instructions or portions of software code of the program or programs according to embodiments of the invention, which instructions are stored in one of the aforementioned storage means. After powering on, the CPU 1801 is capable of executing instructions from main RAM memory 1802 relating to a software application after those instructions have been loaded from the program ROM 1803 or the hard-disc (HD) 1806 for example. Such a software application, when executed by the CPU 1801, causes the steps of the flowcharts described herein to be performed.

Any step of the algorithm described herein may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding an image, the image comprising a plurality of coding elements made of blocks of pixels, each block of pixels being encoded according to a coding mode out of a plurality of coding modes, the method comprising for each block of pixel to be encoded:
   determining the coding mode to be used for the encoding of a given block of pixels by sequentially evaluating some coding modes in the plurality of coding modes;
   wherein the method comprises:
   evaluating Inter coding modes and fast IBC coding modes, fast IBC coding modes evaluation performing a fast analysis using preferred block vectors; and
   conducting a residue-test after evaluation of fast IBC coding modes to early terminate coding mode evaluation in case a coding mode leading to no residue has been found, wherein no residue-test is conducted between the evaluation of the Inter coding mode and the evaluation of the fast IBC mode.

2. The method of claim 1, wherein Inter coding modes and fast IBC coding modes are evaluated in sequence.

3. The method of claim 1, wherein the method further comprises:
   evaluating Intra coding modes and classical IBC coding modes in sequence after the evaluation of Inter coding modes and fast IBC coding modes as a function of the conducted residue-test.

4. The method of claim 3, wherein:
   no residue-test is conducted between the evaluation of the Intra coding mode and the evaluation of the classical IBC mode.

5. The method according to claim 1 wherein said method further comprises:
   evaluating first the Skip coding mode; and
   further evaluation steps are only conducted if the Skip coding mode has not been selected.

6. A non-transitory computer-readable storage medium storing a program for implementing the method according to claim 1.

* * * * *